(12) United States Patent
Isogai et al.

(10) Patent No.: US 9,460,545 B2
(45) Date of Patent: Oct. 4, 2016

(54) APPARATUS AND METHOD FOR GENERATING NEW VIEWPOINT IMAGE

(71) Applicant: PANASONIC CORPORATION, Osaka (JP)

(72) Inventors: Kuniaki Isogai, Osaka (JP); Pongsak Lasang, Singapore (SG); Sheng Mei Shen, Singapore (SG); Yusuke Monobe, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 13/688,316

(22) Filed: Nov. 29, 2012

(65) Prior Publication Data

US 2013/0135298 A1 May 30, 2013

(30) Foreign Application Priority Data

Nov. 30, 2011 (JP) ................................. 2011-262866

(51) Int. Cl.
*G09G 5/00* (2006.01)
*G06T 15/04* (2011.01)
*G06T 15/20* (2011.01)

(52) U.S. Cl.
CPC ............. *G06T 15/04* (2013.01); *G06T 15/205* (2013.01)

(58) Field of Classification Search
CPC .. G06T 1/60; G06K 9/00664; G06K 9/6253; G06K 9/00234; G06K 9/00369; G06K 9/00993; G06K 9/228; G06K 9/38; G06K 9/46; G06K 9/4652; H04N 19/00945; H04N 19/00024; H04N 19/00157; H04N 19/0026; H04N 19/00278; H04N 19/00309; H04N 19/00315; H04N 19/004; H04N 19/00478; H04N 19/00963; H04N 1/00; H04N 1/00307; H04N 1/32101; G09G 5/363; A63F 2300/1093; A63F 2300/5553; A63F 2300/6009; A63F 2300/66; A63F 2300/695; A63F 2300/8011

USPC ....... 345/582, 589, 419, 619, 629, 634, 633, 345/428, 473
See application file for complete search history.

(56) References Cited

U.S. PATENT DOCUMENTS 8,073,292 B2 * 12/2011 Klein Gunnewiek ........ 382/300
8,253,740 B2    8/2012 Varekamp et al.
(Continued)

FOREIGN PATENT DOCUMENTS

JP    2009-528587    8/2009
JP    2009-528747    8/2009
(Continued)

OTHER PUBLICATIONS

Robert M. Haralick, K. Shanmugam, and Its'hak Dinstein, "Textural Features for Image Classification", IEEE Transactions on Systems, Man, and Cybernetics, vol. SMC-3, No. 6, Nov. 1973, p. 610-618.*
(Continued)

*Primary Examiner* — Ke Xiao
*Assistant Examiner* — Gordon Liu
(74) *Attorney, Agent, or Firm* — Wenderoth, Lind & Ponack, L.L.P.

(57) ABSTRACT

An apparatus for generating a new viewpoint image includes: a new viewpoint image generation unit that shifts the foreground image region in the input image, based on a depth map to generate a new viewpoint image including a missing pixel region; a representative background pixel selection unit that selects background pixels located a predetermined number of pixels away from edge pixels, as representative background pixels; a texture direction map calculation unit that calculates a texture direction of each of the selected representative background pixels, to calculate a texture direction map indicating texture directions, each corresponding to one of missing pixels, based on locations of the representative background pixels and locations of the missing pixels included in the missing pixel region; and a hole-filling processing unit that fills the missing pixel region with the obtained background pixels in accordance with the texture direction map.

15 Claims, 20 Drawing Sheets

(56) References Cited

U.S. PATENT DOCUMENTS

| | | | |
|---|---|---|---|
| 8,798,965 B2* | 8/2014 | Quan et al. .................. 703/1 | |
| 2009/0016640 A1 | 1/2009 | Gunnewiek | |
| 2009/0115780 A1 | 5/2009 | Varekamp et al. | |
| 2010/0232729 A1* | 9/2010 | Peleg .................. G06T 11/60 | |
| | | | 382/298 |
| 2010/0238160 A1 | 9/2010 | Yea et al. | |

FOREIGN PATENT DOCUMENTS

| | | |
|---|---|---|
| JP | 2010-218545 | 9/2010 |
| WO | 2007/099465 | 9/2007 |

OTHER PUBLICATIONS

"Depth-Image-Based Rendering (DIBR), Compression and Transmission for a New Approach on 3D-TV" (SPIE vol. 5219 © 2004, by Christoph Fehn).*

Paul Green et al., "Multi-Aperture Photography", ACM Transactions on Graphics, vol. 26, No. 3, Article 68, Jul. 2007.

Shinsaku Hiura et al., "Depth Measurement by the Multi-Focus Camera", IEEE Computer Society Conference on Computer Vision and Pattern Recognition, Jun. 23-25, 1998.

Hajime Nagahara et al., "Flexible Depth of Field Photography", European Conference on Computer Vision (ECCV), Oct. 2008.

Alex Paul Pentland, "A New Sense for Depth of Field", IEEE Transactions on Pattern Analysis and Machine Intelligence, vol. PAMI-9, No. 4, Jul. 1987, pp. 523-531.

Samuel W. Hasinoff et al., "Time-Constrained Photography, Supplementary material", 12th IEEE International Conference on Computer Vision (ICCV 2009), Sep. 29, 2009-Oct. 2, 2009.

Muralidhara Subbarao et al., "Depth Recovery from Blurred Edges", Computer Society Conference on Computer Vision and Pattern Recognition (CVPR '88), Jun. 5-9, 1988.

Changyin Zhou et al., "Coded Aperture Pairs for Depth from Defocus", IEEE International Conference on Computer Vision (ICCV), Oct. 2009.

* cited by examiner

APPARATUS AND METHOD FOR GENERATING NEW VIEWPOINT IMAGE

CROSS REFERENCE TO RELATED APPLICATION

This is an application based on and claims priority of Japanese Patent Application No. 2011-262866 filed on Nov. 30, 2011. The entire disclosure of the above-identified application, including the specification, drawings and claims is incorporated herein by reference in their entirety.

FIELD

One or more exemplary embodiment disclosed herein relate generally to an apparatus and a method for generating a new viewpoint image from an input image.

BACKGROUND

It is known that an image of a scene viewed from a new viewpoint can be generated using a rendering technique based on a depth image (depth image based rendering, DIBR). In other words, it is possible to generate a new viewpoint image of a scene viewed from a new viewpoint, using an input image of a scene viewed from a predetermined viewpoint and a depth image representing the distance between objects in the scene. This new viewpoint image can be generated based on camera geometry using information on the camera position of an original viewpoint and the camera position of a new viewpoint. An original viewpoint image (input image) and the generated new viewpoint image can be used, for example, for 3D display as a left eye image and a right eye image. Likewise, a group of multi-view images can be generated. The group of the multi-view images can be used for multi-viewpoint 3D display.

Therefore, by using the DIBR technique, a 3D image for 3D display can be generated using an input image that is a one-viewpoint image and its corresponding depth map.

However, when a new viewpoint image is generated using an input image, an unknown region (hereinafter referred to also as a hole region) occurs in a region corresponding to an occluded region in the input image (original viewpoint image). Here, the unknown region includes no information or is empty. This is because the occluded region in the original viewpoint image is visualized (disoccluded) in the new viewpoint image. Therefore, in generating a new viewpoint image, it is necessary to fill a hole region using a hole-filling method or a disocclusion method.

Here, Patent Literature 1 suggests an in-painting method based on depth, and Patent Literature 2 suggests a hole-filling method based on the direction of image features.

CITATION LIST

Patent Literature

[PL1] U.S. Patent Application Publication No. 2010/0238160
[PL2] U.S. Patent Application Publication No. 2009/0016640

SUMMARY

However, conventional methods shown in the Patent Literatures 1 and 2 have a problem that a clear and natural new view point image can not be generated. This decreases the visual quality of a 3D image. In other words, a user would feel the 3D image unnatural.

One non-limiting and exemplary embodiment provides an apparatus and a method for generating a new viewpoint image that can generate a clearer and more natural new viewpoint image.

In one general aspect, the techniques disclosed here feature an apparatus for generating a new viewpoint image, which generates, from an input image, a new viewpoint image that is an image of the input image viewed from a new viewpoint, the input image including a foreground image region that is an image region of an object and a background image region other than the foreground image region, the apparatus including: a generation unit that shifts the foreground image region in the input image, based on a depth map corresponding to the input image to generate a new viewpoint image including a missing pixel region; a selection unit that selects background pixels located a predetermined number of pixels away from edge pixels, from among background pixels included in the background image region, as representative background pixels, the edge pixels indicating a boundary between the foreground image region and the background image region in the input image; a texture direction map calculation unit that calculates a texture direction of each of the selected representative background pixels, the texture direction being an edge direction of texture in the background image region for each of the representative background pixels, and to calculate a texture direction map indicating texture directions, each corresponding to one of missing pixels, based on locations of the representative background pixels and locations of the missing pixels included in the missing pixel region; and a hole-filling processing unit that fills the missing pixel region with the background pixels in accordance with the texture direction map.

It should be noted that these general and specific aspects may be implemented using a system, a method, an integrated circuit, a computer program or a computer-readable recording medium such as a CD-ROM, or any combination of systems, methods, integrated circuits, computer programs, or recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

An apparatus and a method for generating a new viewpoint image according to one or more exemplary embodiments or features disclosed herein provide a clearer and more natural new viewpoint image.

BRIEF DESCRIPTION OF DRAWINGS

These and other objects, advantages and features of the disclosure will become apparent from the following description thereof taken in conjunction with the accompanying drawings, by way of non-limiting examples of embodiments disclosed herein.

FIG. 10 shows an example of calculation for the texture directions of representative background pixels selected in an input image according to the first embodiment.

DETAILED DESCRIPTION OF INVENTION

Figure 1:
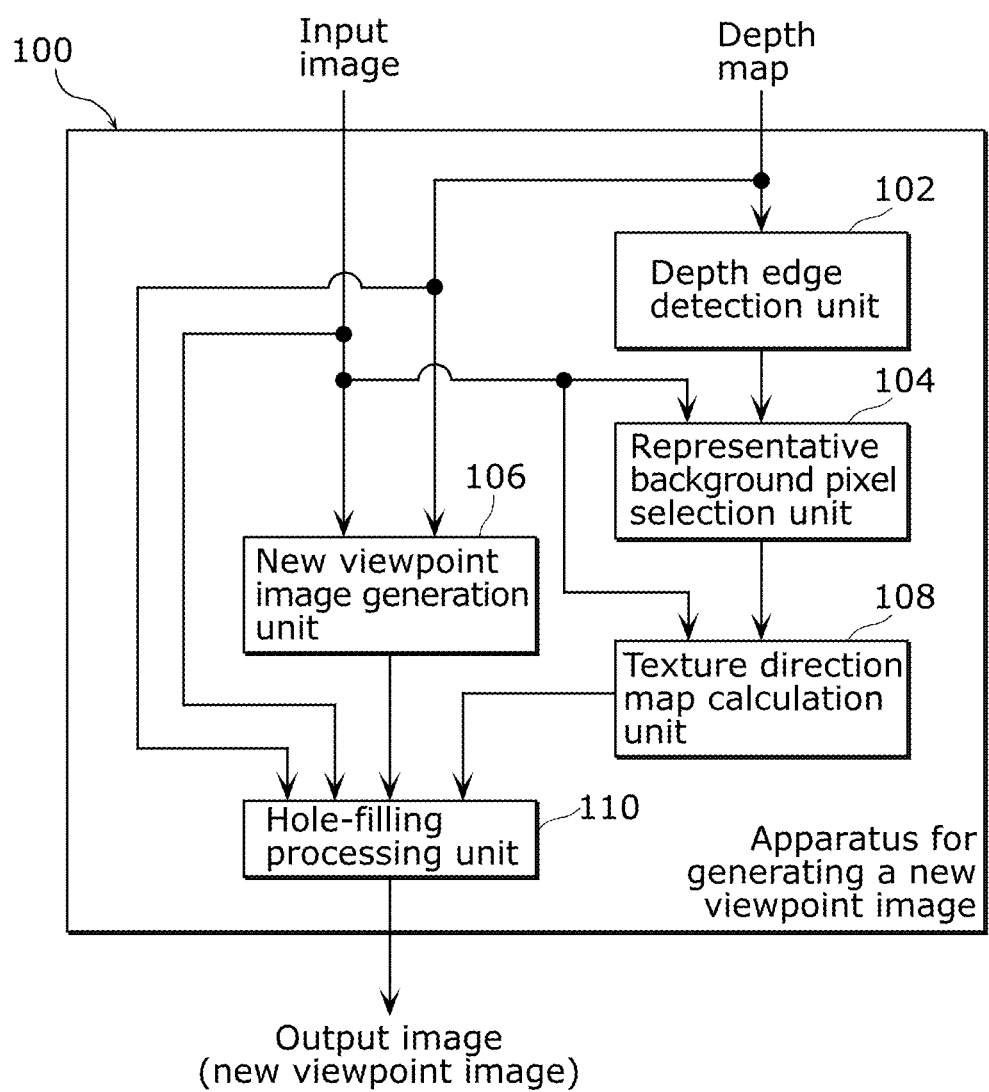
FIG. 1 is a block diagram showing a configuration example of an apparatus for generating a new viewpoint image 100 according to the first embodiment.

Underlying Knowledge Forming Basis of the Present Disclosure

When a new viewpoint image is generated using an input image, a hole region occurs in a region corresponding to an occluded region in an input image (original viewpoint image). Therefore, it is necessary to fill a hole region using a hole-filling method or a disocclusion method.

As a well-known hole-filling method, an interpolation (or extrapolation) method based on a bilinear interpolation using pixels on the both sides (or the background side) of a hole region is known.

However, although working well for a small hole region, this method may cause problems such as blurred edges, boundary artifacts, and object distortions for a large hole region. When a new viewpoint image having artifacts is used for a 3D image, 3D display quality significantly decreases.

Moreover, techniques such as symmetric or asymmetric depth map smoothing are known as a technique to reduce the size of a hole region. However, this method has a problem that geometric distortion occurs in an object. In other words, using a 3D image generated by this method reduces the effects of 3D display.

On the other hand, Patent Literature 1 suggests an in-painting method based on a depth value. This in-painting method uses background pixels to reduce geometric distortion and improve the quality of filling a hole region. However, this in-painting method tends to produce blurred texture around a hole region, and thus a clear and natural new viewpoint image cannot be generated.

Moreover, Patent Literature 2 suggests a method for filling a hole region based on the direction of image features. This method for filling the hole region estimates the direction of image features and fills a pixel in the hole region using a pixel value calculated from a pixel set in the estimated direction. However, this method for filling the hole region often cannot correctly estimate the direction or obtain a satisfactory result. For example, when foreground objects are on the both sides of a hole region, this method cannot estimate the correct direction. Moreover, another problem is that this method is ineffective for non-linear texture.

Here, one non-limiting and exemplary embodiment provides an apparatus and a method for generating a new viewpoint image that can generate a clearer and more natural new viewpoint image.

According to an exemplary embodiment disclosed herein, an apparatus for generating a new viewpoint image according to an aspect of the present disclosure, generates, from an input image, a new viewpoint image that is an image of the input image viewed from a new viewpoint, the input image including a foreground image region that is an image region of an object and a background image region other than the foreground image region. The apparatus includes: a generation unit that shifts the foreground image region in the input image, based on a depth map corresponding to the input image to generate a new viewpoint image including a missing pixel region; a selection unit that selects background pixels located a predetermined number of pixels away from edge pixels, from among background pixels included in the background image region, as representative background pixels, the edge pixels indicating a boundary between the foreground image region and the background image region in the input image; a texture direction map calculation unit that calculates a texture direction of each of the selected representative background pixels, the texture direction being an edge direction of texture in the background image region for each of the representative background pixels, and to calculate a texture direction map indicating texture directions, each corresponding to one of missing pixels, based on locations of the representative background pixels and locations of the missing pixels included in the missing pixel region; and a hole-filling processing unit that fills the missing pixel region with the background pixels in accordance with the texture direction map.

This configuration can realize an apparatus for generating a new viewpoint image that can generate a clearer and more natural new viewpoint image.

More specifically, as the apparatus for generating a new viewpoint image according to the present aspect can generate clear and natural image texture, it is possible to reduce blur and boundary artifacts while maintaining the shape of a foreground image region. This can improve image quality, and thus better 3D effects can be obtained. In other words, it is possible to reduce discomfort when a user is viewing a 3D image.

Moreover, an apparatus for generating a new viewpoint image according to the aspect can correctly calculate the direction of background texture in various cases. Therefore, the quality of the output image improves.

For example, the texture direction map calculation unit may include: a texture direction calculation unit that calculates texture directions of the representative background pixels; and a map calculation unit that calculates the texture direction map by weighting the texture directions of the representative background pixels based on the locations of the representative background pixels and the locations of the missing pixels and calculating the texture directions, each corresponding to one of the missing pixels.

For example, the map calculation unit may calculate the texture directions, each corresponding to one of the missing pixels, by (i) calculating a direction in which weighted texture directions of the representative background pixels are summed, as one of preliminary texture directions of the missing pixels, in accordance with distances between one of the missing pixels and the representative background pixels and directions of the representative background pixels with respect to one of the missing pixels and (ii) averaging each of the calculated preliminary texture directions of the missing pixels.

For example, the reliability value calculation unit may calculate a reliability value for a texture direction of a representative background pixel to be calculated, based on (i) a distance from a calculated representative background pixel to the representative background pixel to be calculated and (ii) an orientation of a vector of the calculated representative background pixel with respect to the representative background pixel to be calculated.

For example, the reliability value calculation unit may calculate a reliability value for a texture direction of a representative background pixel to be calculated, based on (i) a distance from a calculated representative background pixel to the representative background pixel to be calculated and (ii) an orientation of a vector of the calculated representative background pixel with respect to the representative background pixel to be calculated.

For example, the texture direction calculation unit may trace edges of texture of the background image region from the selected representative background pixels as starting points to calculate the texture directions of the selected representative background pixels.

For example, the apparatus for generating a new viewpoint image according to an aspect of the present disclosure may further include an edge strength calculation unit that calculates edge strength for each of the selected representative background pixels, in which when the edge strength of the representative background pixel is greater than a threshold, the texture direction map calculation unit may calculate a texture direction of the representative background pixel.

For example, the apparatus for generating a new viewpoint image according to an aspect of the present disclosure may further include an edge detection unit that detects, based on the depth map, edge pixels indicating a boundary between the foreground image region and the background image region in the input image, in which the selection unit may select, as the representative background pixels, background pixels located a predetermined number of pixels away from the edge pixels in a predetermined direction, the edge pixels being detected by the edge detection unit.

For example, the selection unit may, for each of the edge pixels detected by the edge detection unit, calculate an average value of horizontal differential coefficients and an average value of vertical differential coefficients for the edge pixel, determine an orthogonal direction of the edge pixel as the predetermined direction, using the average value of the horizontal differential coefficients and the average value of the vertical differential coefficients, and select, as one of the representative background pixels, a background pixel located a predetermined number of pixels away from the edge pixel in the determined orthogonal direction.

For example, the generation unit may generate a new viewpoint image including the missing pixel region by (i) shifting the foreground image region in the input image, based on a depth value in the depth map, a distance between a right eye and a left eye, and a zero eye position and (ii) shifting the depth value in a region of the depth map corresponding to the foreground image region.

For example, the apparatus for generating a new viewpoint image according to an aspect of the present disclosure may further include a filter that filters a new depth map corresponding to the new viewpoint image to smooth a depth value that is a depth value in a region of the new depth map corresponding to the missing pixel region and is a depth value less than or equal to a predetermined value.

For example, the filling unit may include: a direction obtaining unit that refers to the calculated texture direction map to obtain the texture directions, each corresponding to one of the missing pixels; a distance determination unit that calculates distances from edge pixels to the missing pixels, the edge pixels being in the obtained texture directions, each corresponding to one of the missing pixels; a pixel obtaining unit that obtains, based on the distances, background pixels in the corresponding texture directions; and a filling unit that calculates pixel values of missing pixels, using the obtained background pixels to fill the missing pixel region, the pixel values being values having the corresponding texture directions.

It should be noted that these general and specific aspects may be implemented using a system, a method, an integrated circuit, a computer program or a computer-readable recording medium such as a CD-ROM, or any combination of systems, methods, integrated circuits, computer programs, or recording media.

With reference to the drawings, the following specifically describes an apparatus and a method for generating a new viewpoint image according to an aspect of the present disclosure.

It should be noted that each of the exemplary embodiments described below shows a general or specific example. The numerical values, shapes, materials, structural elements, the arrangement and connection of the structural elements, steps, the processing order of the steps and so on shown in the following exemplary embodiments are mere examples, and are not intended to limit the present disclosure. Therefore, among the structural elements in the following exemplary embodiments, structural elements not recited in any one of the independent claims representing superordinate concept are described as arbitrary structural elements.

Embodiment 1

FIG. 1 is a block diagram showing a configuration example of an apparatus for generating a new viewpoint image 100 according to the present embodiment.

The apparatus for generating a new viewpoint image 100 shown in FIG. 1 generates, from an input image, a new viewpoint image that is an image of the input image viewed from a new viewpoint. Specifically, the apparatus for generating a new viewpoint image 100 separately takes in an input image and a depth map, and generates a new viewpoint image based on these input image and depth map. The following explanation assumes that the input image includes a foreground image region that is the image region of an object and a background image region other than the foreground image region, and the depth map includes depth information on the foreground and background image regions such as information indicating the distance between scene objects.

The apparatus for generating a new viewpoint image 100 includes a depth edge detection unit 102, a representative background pixel selection unit 104, a new viewpoint image generation unit 106, a texture direction map calculation unit 108, and a hole-filling processing unit 110.

The depth edge detection unit 102 detects, based on a depth map corresponding to an input image, edge pixels in the input image that indicate a boundary between foreground and background image regions. In other words, the depth edge detection unit 102 detects edge pixel locations in the depth map that indicate boundary points between a foreground object (foreground image region) and a background object (background image region). The depth edge detection unit 102 can thus detect a boundary between the foreground and background image regions in the input image.

The representative background pixel selection unit 104 is an example of a selection unit, and selects, from background pixels included in a background image region, background pixels located a predetermined number of pixels away from the edge pixels indicating the boundary between the foreground and background image regions in the input image.

Specifically, the representative background pixel selection unit 104 selects, as representative background pixels, background pixels located a predetermined number of pixels away from edge pixels in a predetermined direction. Here, the edge pixels are detected by the depth edge detection unit 102. In other words, the representative background pixel selection unit 104 selects, as representative background pixels, background pixels located in a predetermined direction and distance from the locations of edge pixels in the input image corresponding to the detected edge pixels in the depth map.

Here, for example, the representative background pixel selection unit 104 may, for each of the edge pixels detected by the depth edge detection unit 102, (i) calculate the average value of horizontal differential coefficients and the average value of vertical differential coefficients for the edge pixel, (ii) determine the orthogonal direction of the edge pixel, using the calculated average values of the horizontal and vertical differential coefficients, and (iii) select, as a representative background pixel, a background pixel located a predetermined number of pixels away from the edge pixel in the determined orthogonal direction.

The new viewpoint image generation unit 106 is an example of a generation unit, and generates a new viewpoint image including a missing pixel region by shifting the foreground image region in the input image based on the depth map. In other words, the new viewpoint image generation unit 106 generates a new viewpoint image including missing pixels, based on the input image and the depth map.

For instance, the new viewpoint image generation unit 106 generates a new viewpoint image including a missing pixel region by (i) shifting the foreground image region in the input image, based on a depth value indicated by the depth map, the distance between right and left eyes, and zero eye position and (ii) shifting the depth value in a region of a depth map corresponding to the foreground image region.

Thus, in the present embodiment, the new viewpoint image generation unit 106 not only generates a new viewpoint image by shifting the input image, but also generates, in the same way, a new depth map corresponding to a new viewpoint image by shifting the depth map. It should be noted that details will be described later.

The texture direction map calculation unit 108 (i) calculates the texture directions of representative background pixels which are the edge directions of texture of the background region from the selected representative background pixels as starting points and (ii) calculate a texture direction map indicating texture directions, each corresponding to one of missing pixels, based on the locations of the representative background pixels and the locations of the missing pixels included in the missing pixel region.

In other words, the texture direction map calculation unit 108 calculates a texture direction map indicating texture directions in a background image region (hereinafter referred to also as x-y directions) for missing pixels. It should be noted that the x-y directions are used for obtaining background pixels used for calculation of respective pixel values with which each missing pixel should be filled.

Figure 2A:
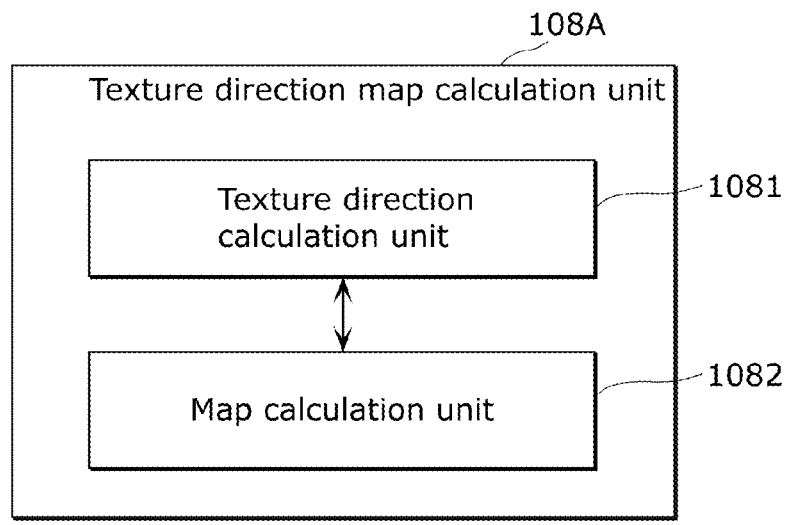
FIG. 2A is a block diagram showing a detailed configuration of a texture direction map calculation unit according to the first embodiment.
Figure 2B:
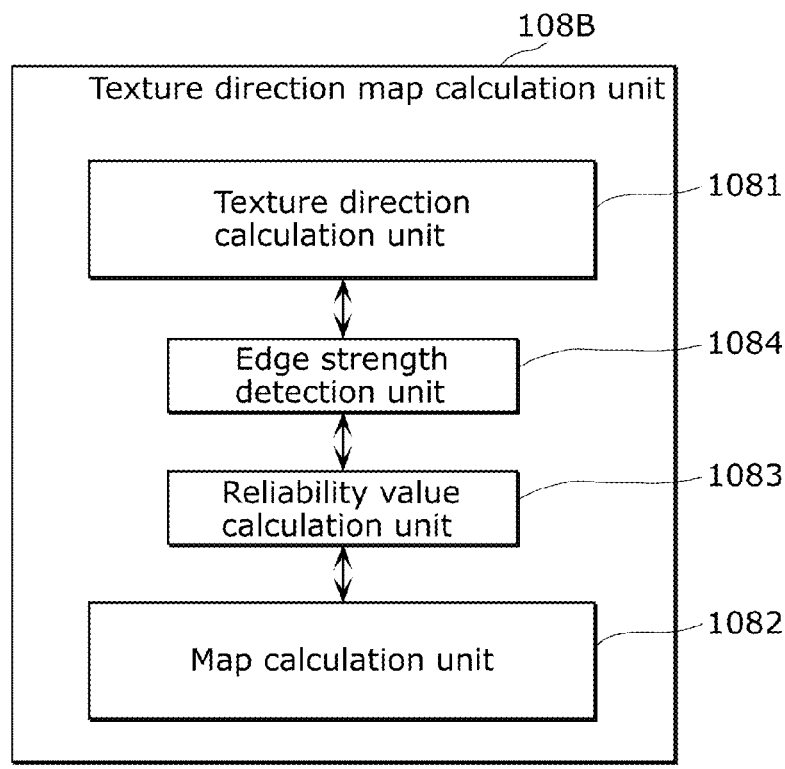
FIG. 2B is a block diagram showing a detailed configuration of a texture direction map calculation unit according to the first embodiment.

FIGS. 2A and 2B are block diagrams showing detailed configurations of a texture direction map calculation unit according to the present embodiment. As shown in FIG. 2A, a texture direction map calculation unit 108A may include a texture direction calculation unit 1081 and a map calculation unit 1082. It should be noted that as shown in FIG. 2B, a texture direction map calculation unit 108B may further include a reliability value calculation unit 1083 and an edge strength detection unit 1084. The following is an example that the texture direction map calculation unit 108 has the configuration shown in FIG. 2B.

The reliability value calculation unit 1083 calculates a reliability value for the texture direction of each of the calculated representative background pixels. Specifically, the reliability value calculation unit 1083 calculates a reliability value for the texture direction of a representative background pixel to be calculated, based on (i) the distance from a calculated representative background pixel to the representative background pixel to be calculated and (ii) the orientation of a vector of the calculated representative background pixel with respect to the representative background pixel to be calculated. It should be noted that the reliability value indicates the accuracy of the calculated texture direction.

The edge strength detection unit 1084 calculates edge strength for each representative pixel selected by the representative background pixel selection unit 104.

The texture direction calculation unit 1081 calculates the texture directions of the representative background pixels. Specifically, the texture direction calculation unit 1081 calculates texture directions by tracing edges of texture in a background image region from the selected representative background pixels as starting points. Here, for example, when the edge strength of one of the representative background pixels is greater than a threshold, the texture direction calculation unit 1081 may calculate the texture direction of the representative background pixel.

The map calculation unit 1082 weights the texture directions of representative background pixels, based on the locations of the representative background pixels and the locations of the missing pixels to calculate texture directions, each corresponding to one of the missing pixels, and thus calculate a texture direction map indicating the texture directions, each corresponding to one of the missing pixels.

Here, for example, the map calculation unit 1082 may calculate (i) a direction in which weighted texture directions of representative background pixels are summed (blended), as one of the preliminary texture directions of the missing pixels, in accordance with distances between one of the missing pixels and the representative background pixels and the directions of the representative background pixels with respect to one of the missing pixels and (ii) texture directions, each corresponding to one of the missing pixels by averaging each of the calculated preliminary texture directions of the missing pixels. Moreover, for example, the map calculation unit 1082 weights the texture direction or texture directions of at least one first representative background pixel, based on the location or locations of the at least one first representative background pixel for which a reliability value greater than a predetermined threshold value is calculated by the reliability value calculation unit 1083, among the representative background pixels to calculate texture directions, each corresponding to one of the missing pixels.

The following description is based on FIG. 1. The hole-filling processing unit 110 is an example of a hole-filling processing unit, and fills a missing pixel region, using background pixels obtained based on a texture direction map. In other words, the hole-filling processing unit 110 fills each missing pixel, using a background pixel obtained for each missing pixel based on the calculated texture direction map. Thus, an output image (new viewpoint image) can be obtained.

Figure 3:
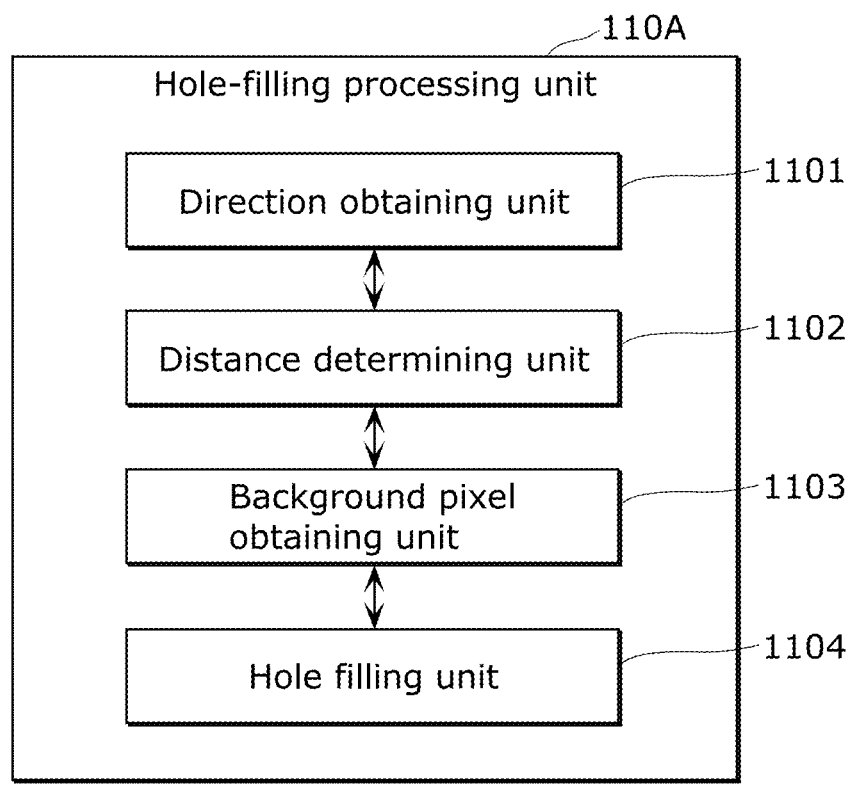
FIG. 3 is a block diagram showing a detailed configuration of a hole-filling processing unit according to the first embodiment.

FIG. 3 is a block diagram showing a detailed configuration of a hole-filling processing unit according to the present embodiment. As shown in FIG. 3, a hole-filling processing unit 110A may include a direction obtaining unit 1101, a distance determining unit 1102, a background pixel obtaining unit 1103, and a hole filling unit 1104.

The direction obtaining unit 1101 refers to a calculated texture direction map to obtain texture directions, each corresponding to one of the missing pixels. The distance determining unit 1102 calculates distances from edge pixels to the missing pixels, the edge pixels being in texture directions, each corresponding to one of missing pixels obtained by the direction obtaining unit 1101. The background pixel obtaining unit 1103 obtains background pixels in the corresponding texture directions, based on the distances calculated by the distance determining unit 1102. The hole filling unit 1104 is an example of a filling unit, and calculates pixel values for missing pixels, using the background pixels obtained by the background pixel obtaining unit 1103 to fill a missing pixel region. Here, the pixel values have the corresponding texture directions.

It should be noted that the apparatus for generating a new viewpoint image 100 configured as above and structural elements (units) included therein are typically achieved in the form of integrated circuit (ICs), application-specific integrated circuits (ASIC), large scale integrated (LSI) circuits, digital signal processor (DSP), or achieved by any CPU based processor, such as ARM, and machine including personal computer (PC). Each of these modules can be in many single-function LSIs, or can be in one integrated LSI. The name used here is LSI, but it may also be called IC, system LSI, super LSI, or ultra LSI in accordance with the degree of integration. Moreover, ways to achieve integration are not limited to the LSI, and a special circuit or a general purpose processor may also achieve the integration. This includes a specialized microprocessor such as digital signal processor (DPS) that can be directed by the program instruction. Field Programmable Gate Array (FPGA) that can be programmed after manufacturing LSI or a reconfigurable processor that allows re-configuration of the connection or configuration of LSI can be used for the same purpose. In the future, with advancement in manufacturing and process technology, a brand-new technology may replace LSI. The integration can be achieved by such a technology. As an embodiment, the apparatus for generating a new viewpoint image 100 may be incorporated into imaging devices such as digital still cameras and movie cameras. Moreover, as shown in a general purpose imaging system, the apparatus for generating a new viewpoint image 100 may be implemented in a standalone device to work with an imaging system but other implementations are also possible. The apparatus for generating a new viewpoint image 100 may be implemented in other types of devices.

The following describes the operations of the apparatus for generating a new viewpoint image 100 configured as above.

Figure 4:
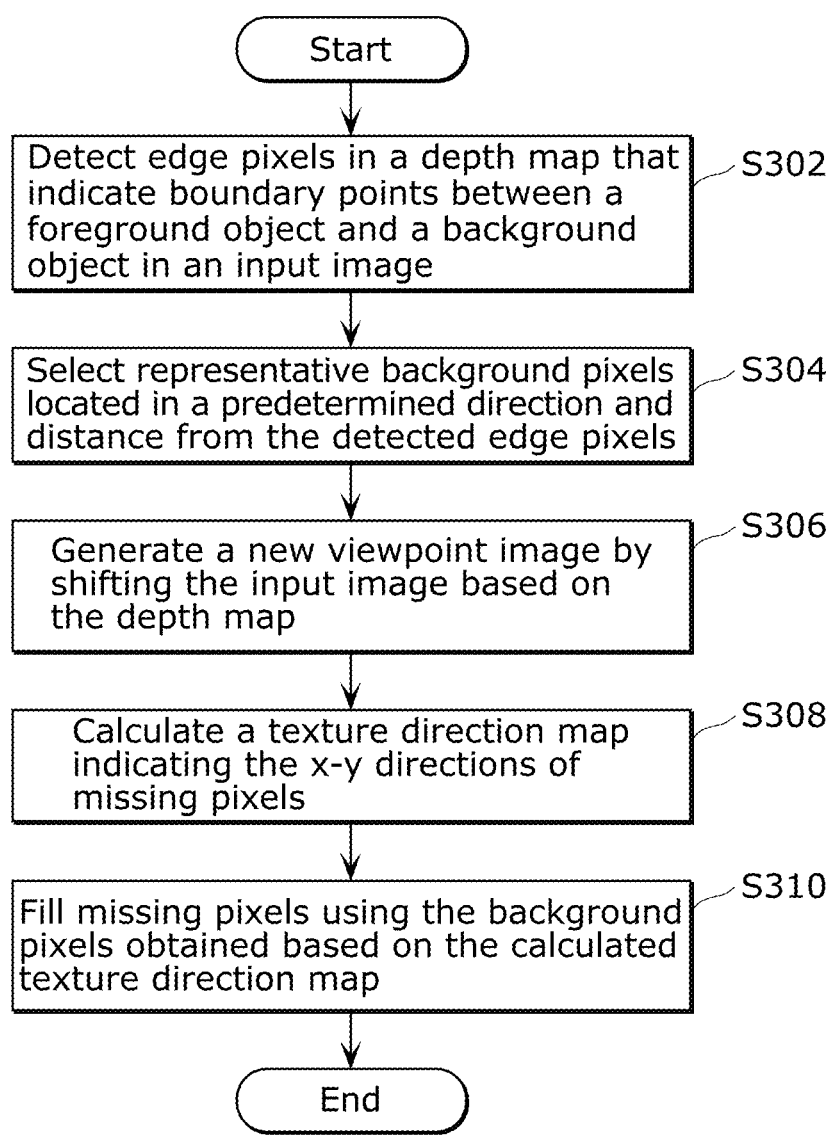
FIG. 4 is a flowchart showing the operations of an apparatus for generating a new viewpoint image according to the first embodiment.

FIG. 4 is a flowchart showing the operations of an apparatus for generating a new viewpoint image according to the present embodiment.

First, the apparatus for generating a new viewpoint image 100 separately takes in an input image and a depth map.

The depth edge detection unit 102 detects edge pixels in the depth map that indicate boundary points between foreground and background image regions (S302). The depth edge detection unit 102 can detect edge pixels in the input image that indicate boundary points between the foreground and background regions, based on the edge pixels in the depth map.

The representative background pixel selection unit 104 selects, as representative background pixels, background pixels located in a predetermined direction and distance from the locations of the detected edge pixels in the input image (S304). For example, the representative background pixel selection unit 104 selects, as representative background pixels, background pixels located in a predetermined direction and distance from the edge pixels in the input image corresponding to the detected edge pixels in the depth map.

The new viewpoint image generation unit 106 generates a new viewpoint image including missing pixels by shifting the foreground image region of the input image based on the depth map (S306).

The texture direction map calculation unit 108 calculates a texture direction map indicating the x-y directions of missing pixels (S308).

Finally, at step S310, missing pixels are filled using background pixels obtained based on the calculated texture direction map (S310).

The apparatus for generating a new viewpoint image operates as above, and generates a new viewpoint image that is an image of an input image viewed from a new viewpoint, from the input image and the corresponding depth map.

Figure 5A:
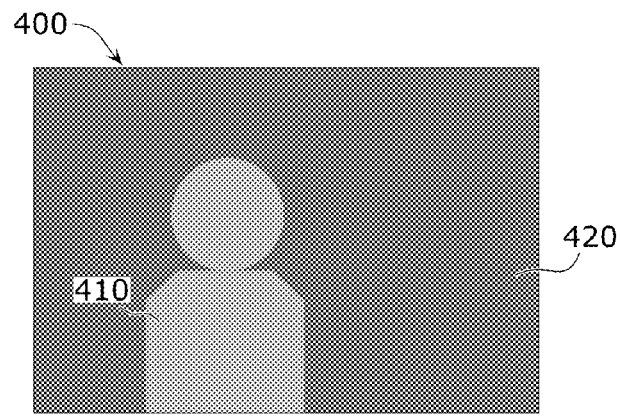
FIG. 5A shows an example of a depth map according to the first embodiment.
Figure 5B:
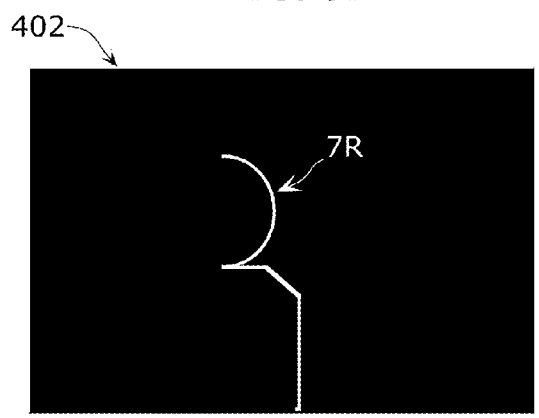
FIG. 5B shows an example of a depth map according to the first embodiment.
Figure 5C:
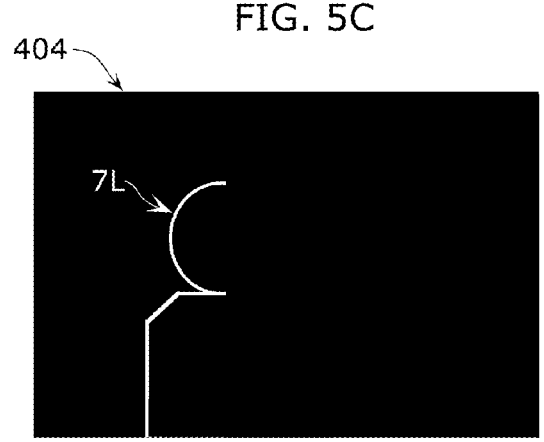
FIG. 5C shows an example of a depth map according to the first embodiment.

FIGS. 5A to 5C show examples of a depth map according to the present embodiment.

As shown in FIG. 5A, a depth map 400 has the depth values of a foreground object 410 and a background object 420. Here, the foreground object 410 and the background object 420 in the depth map 400 correspond to a foreground object (foreground image region) and a background object (background image region) in an input image, respectively.

Observing the depth map 400 reveals an occluded region and a hole region (hereinafter referred to also as a missing pixel region) in a new viewpoint image to be generated. This is because the foreground image region in an input image corresponding to the foreground object 410 having a small depth value always occludes the background image region in the input image corresponding to the background object 420 having a large depth value. Here, in FIG. 5A, the foreground object 410 is a brighter color image region and the background object 420 is a darker color image region.

Therefore, a location where a hole (missing pixel) occurs can be identified based on the difference between depth values. For example, this can be achieved by performing a simple differentiation for the horizontal direction of the depth map 400. More specifically, a location where the difference between depth values on the depth map 400 is greater than a threshold (e.g., three) is detected as a depth edge pixel.

Here, when a right viewpoint image is generated from an input image, only the right depth edge pixels of the foreground object 410 may be detected, for example, as shown in a depth map 402 in FIG. 5B. On the other hand, when a left viewpoint image is generated from the input image, only the left depth edge pixels of the foreground object 410 may be detected, for example, as shown in a depth map 404 in FIG. 5C. In other words, detected right depth edge pixels 7R and left depth edge pixels 7L indicate boundary points between the foreground object 410 and the background object 420.

It should be noted that the sign (+, −) of a differentiation result may differentiate the right and left depth edge pixels of the foreground object 410.

Here, the right depth edge pixels of the depth map can be calculated, for example, as the following equation 1.

[Math. 1]

$$e_D(p) = \begin{cases} 255, & \text{if } (D(p) - D(p+1)) > thr \\ 0, & \text{otherwise} \end{cases} \quad \text{(Equation 1)}$$

Here, D(p) denotes an inputted depth map. p denotes the vector of (x, y)th location (pixel location) in the depth map. Moreover, p+1 denotes the next pixel location in the x direction.

Figure 6:
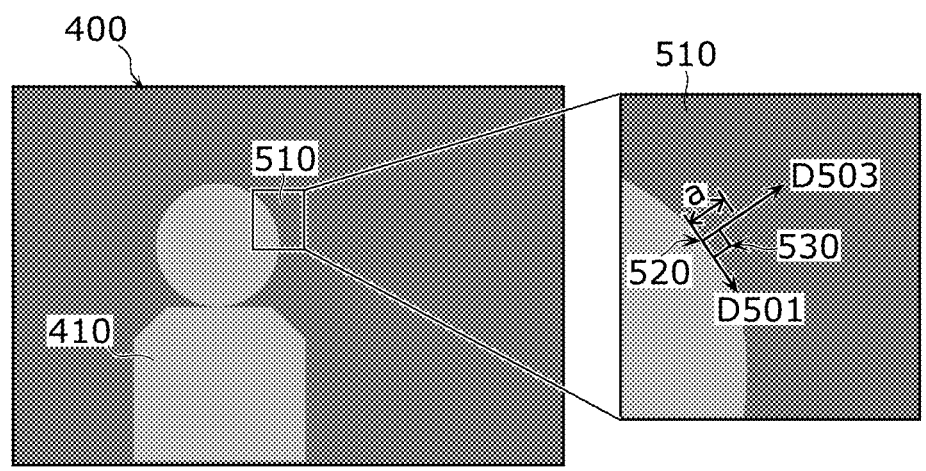
FIG. 6 shows an example of a method for selecting a representative background pixel according to the first embodiment.

The following describes the details of S304 in FIG. 4 with reference to FIG. 6. FIG. 6 shows an example of a method for selecting a representative background pixel according to the present embodiment.

As described above, the representative background pixel selection unit 104 selects, as representative background pixels, background pixels located in a predetermined direction and distance from edge pixels in the input image corresponding to detected edge pixels in the depth map. The selected representative background pixels are used for calculation of a texture direction map. It should be noted that the representative background pixel selection unit 104 may select, as representative background pixels, background pixels in the input image corresponding to background pixels located in a predetermined direction and distance from detected edge pixels in the depth map.

For example, as shown in FIG. 5B or 5C, the representative background pixel selection unit 104 can determine, from edge pixels in the depth map 400 detected by the depth edge detection unit 102, boundary points between the foreground object 410 (corresponding to a foreground image region in the input image) and the background object 420 (corresponding to a background image region in the input image). Therefore, the representative background pixel selection unit 104 can select representative background pixels.

Here, the following describes an example of a region 510 including the boundary points between the foreground object 410 and the background object 420.

The representative background pixel selection unit 104 may determine a depth edge direction D501 that is an edge direction for an edge pixel 520 in the region 510. Here, the representative background pixel selection unit 104 may determine the depth edge direction D501 by, for example, calculating horizontal and vertical differential coefficients on the depth map for the pixels adjacent to the edge pixel 520. Moreover, the representative background pixel selection unit 104 may determine the depth edge direction D501 by calculating horizontal and vertical differential coefficients using, for example, the well-known Sobel operator.

The representative background pixel selection unit 104 determines a direction D503 corresponding to the predetermined direction. It should be noted that the direction D503 is orthogonal with respect to the depth edge direction D501 (an angle 530 is 90 degrees). Of course, the direction D503 does not have to be orthogonal with respect to the depth edge direction D501 (the angle 530 does not have to be 90 degrees).

The representative background pixel selection unit 104 determines the distance of the direction D503 corresponding to the predetermined distance, and selects, as representative background pixels, background pixels located in this distance in the input image. It should be noted that here, the locations of the selected background pixels on the depth map 400 corresponds to the locations of representative background pixels in the input image.

The following describes the details of S306 in FIG. 4. As mentioned above, at S306, a new viewpoint image including missing pixels is generated by shifting a foreground image region in an input image based on a depth map.

It should be noted that in the conventional DIBR method, a new viewpoint image is generated by directly shifting the input image to a target viewpoint (sometimes called 3D warping). However, in the method, cracks (artifacts) in a new viewpoint image are often observed to occur. When a 3D image is generated using a new viewpoint image having cracks (artifacts), the quality of the 3D image significantly decreases. These cracks (artifacts) are caused by depth quantization and rounding errors when a shift amount is calculated.

To avoid this problem, in the present embodiment, a depth map is shifted in the same way as the input image is shifted.

Thus, cracks in a new viewpoint image can be effectively removed from the shifted depth map (hereinafter referred to as a new depth map).

Here, a new depth map $D_N$ can be calculated using Equation 2. In Equation 2, D denotes a depth map corresponding to the input image, and $D_N$ denotes a shifted depth map, i.e., a new depth map.

[Math. 2]

$$D_N(p+d)=D(p) \quad \text{(Equation 2)}$$

It should be noted that in Equation 2, p denotes a vector indicating the (x, y)th location in the depth map, and d(=dx, 0) denotes a horizontal shifting vector.

Here, a shift amount $d_x$ is expressed by Equation 3.

[Math. 3]

$$d_x=(Z-D(p))\times B \quad \text{(Equation 3)}$$

In Equation 3, Z denotes a zero-parallax setting (zps) parameter, and B denotes a baseline parameter provided by a user. Here, the baseline parameter, for example, includes the distance between the right eye and left eye of the user.

However, also in the present embodiment, cracks (artifacts) may occur between the foreground and background image regions of a new viewpoint image that is a shifted input image. The cracks occur inside the foreground image region and break the texture of the foreground image region in the new viewpoint image.

Therefore, in the present embodiment, to efficiently remove cracks, a simple 3×3 maximum filter may be applied to a new depth map (shifted depth map) so that the texture of the foreground image region in the new viewpoint image is not broken.

In other words, the apparatus for generating a new viewpoint image 100 may include a filter that filters a new depth map corresponding to a new viewpoint image to smooth a depth value that is a depth value in a region of the new depth map corresponding to a missing pixel region and that is a depth value less than or equal to a predetermined value.

It should be noted that not only the simple 3×3 maximum filter but also other types of filters may be used as a filter for removing cracks.

After the new depth map (shifted depth map) is generated, the new viewpoint image generation unit 106 generates a new viewpoint image, using a similar scheme.

For example, the new viewpoint image generation unit 106 can efficiently generate a new viewpoint image $I_N$ from an input image $I_L$, using Equation 4 to correspond to a case when a camera is set parallel to the ground and images for the left and right eyes are captured.

[Math. 4]

$$I_N(p)=I_L(p-d) \quad \text{(Equation 4)}$$

Here, d=(dx, 0) is a horizontal shifting vector, and $d_x$ is expressed by Equation 5. It should be noted that z denotes a zero parallax setting (zps) parameter also in Equation 5. Moreover, B denotes a baseline parameter provided by a user, and $D_N$ denotes a new depth map.

[Math. 5]

$$d_x=(Z-D_N(p))\times B \quad \text{(Equation 5)}$$

Figure 7A:
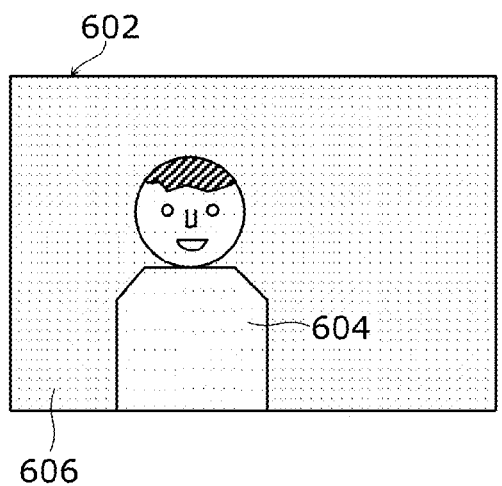
FIG. 7A shows an example of an input image according to the first embodiment.
Figure 7B:
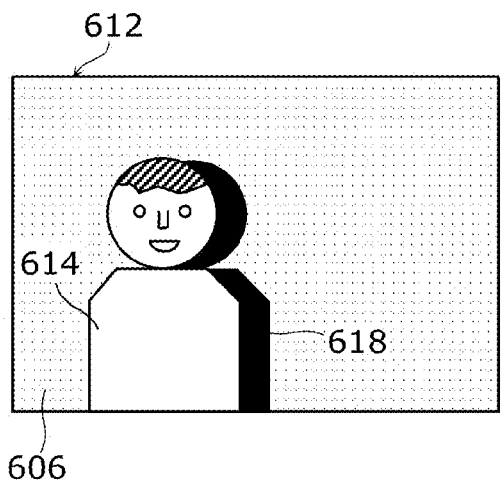
FIG. 7B shows an example of a generated new viewpoint image including missing pixels according to the first embodiment.

With reference to FIGS. 7A and 7B, the following describes a case when a new viewpoint image including missing pixels is generated from an input image.

FIG. 7A shows an example of an input image according to the present embodiment. FIG. 7B shows an example of a generated new viewpoint image including missing pixels according to the present embodiment.

FIG. 7A shows an example of an input image 602 including a foreground image region 604 and a background image region 606. The depth map 400 shown in FIG. 5A is an example of a depth map corresponding to the input image 602. The foreground image region 604 in the input image 602 corresponds to the foreground object 410 in the depth map 400. Likewise, the background image region 606 in the input image 602 corresponds to the background object 420 in the depth map 400.

FIG. 7B shows an example of a generated new viewpoint image 612 including missing pixels and an example that the new viewpoint image 612 is generated as an image for the right eye.

The new viewpoint image generation unit 106 generates the new viewpoint image 612 by shifting a foreground image region 614 in the input image 602 based on the depth values and the parameters (B and Z) in the above equations. A hole region 618 (missing pixel region) occurs in the new viewpoint image 612. As shown in FIG. 7B, when an image for the right eye is generated, the hole region 618 appears on the right side of the foreground image region 614. However, it is necessary to fill the hole region 618 to generate the new viewpoint image 612 as the best output image (image for the right eye).

It should be noted that in the present embodiment, since cracks are removed from a new depth map corresponding to the new viewpoint image 612, cracks (artifacts) are reduced in the new viewpoint image 612.

Figure 8:
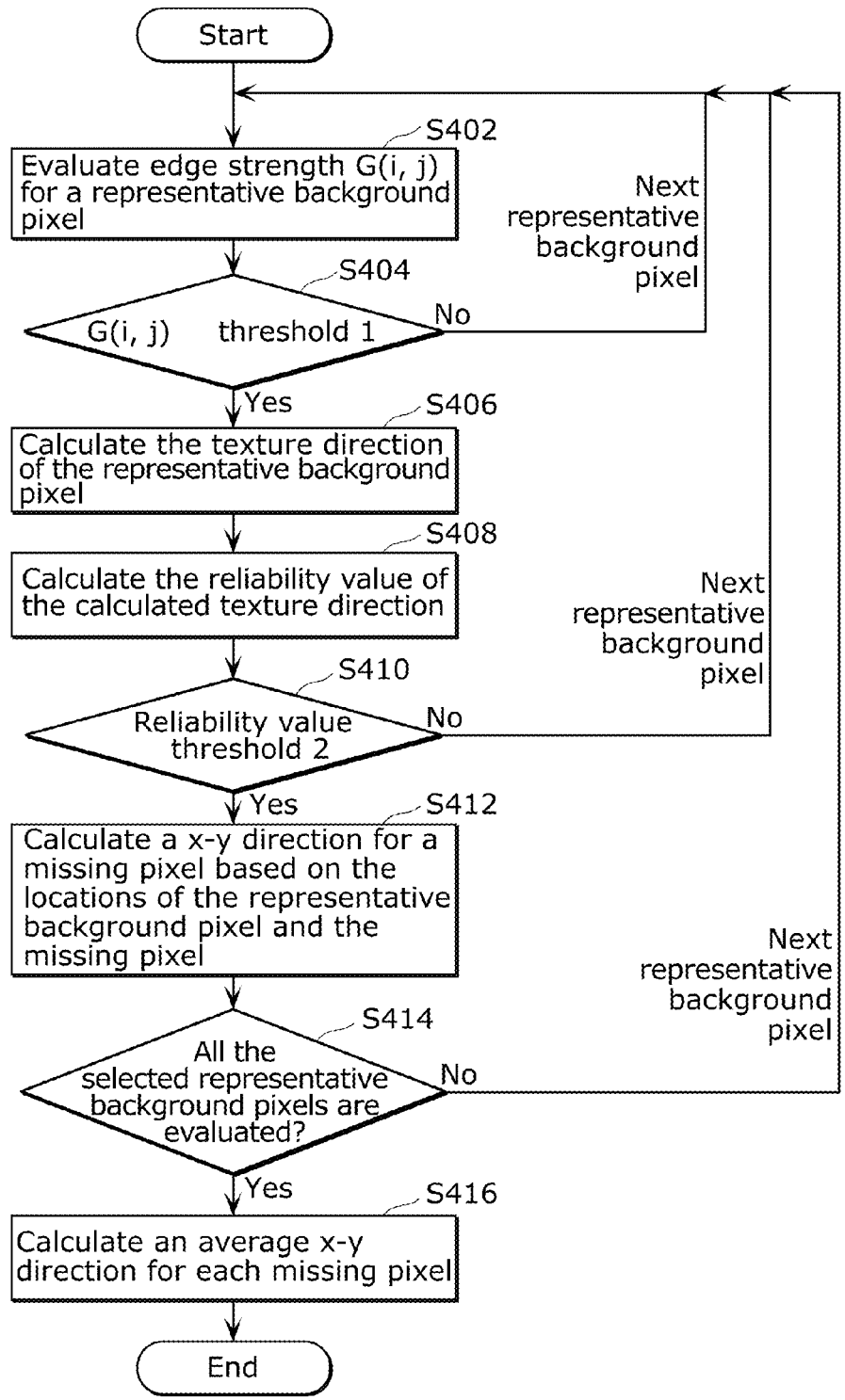
FIG. 8 is a flowchart showing a detailed procedure for calculating a texture direction map according to the first embodiment.

The details of S304 in FIG. 4 will be described with reference to FIG. 8. FIG. 8 is a flowchart showing a detailed procedure for calculating a texture direction map according to the present embodiment.

As mentioned above, at S308, the texture direction map calculation unit 108 calculates a texture direction map indicating the x-y directions of missing pixels (texture directions in a background image region).

At S304 shown in FIG. 4, representative background pixels are selected in an input image. In this case, the edge strength detection unit 1084 evaluates edge strength G for one of the representative background pixels selected by the representative background pixel selection unit 104 (S402).

The texture direction calculation unit 1081 compares the edge strength G for the representative background pixel and a threshold 1 (Thr1) (S404). At S404, when the edge strength G is greater than the threshold 1 (Thr1) (Yes at S404), the texture direction calculation unit 1081 proceeds to S406. It should be noted that when the edge strength G is less than or equal to the threshold 1 (Thr1) (No at S404), the texture direction calculation unit 1081 goes back to S402. At S402, the edge strength detection unit 1084 evaluates edge strength G for a next one of the representative background pixels.

The texture direction calculation unit 1081 calculates the texture direction of a representative background pixel for which the edge strength is determined to be greater than the threshold (S406).

The reliability value calculation unit 1083 calculates the reliability value of the calculated texture direction (S408). Here, this reliability value indicates the accuracy of the calculated texture direction.

The map calculation unit 1082 compares the reliability value calculated by the reliability value calculation unit 1083 and a threshold 2 (Thr2) (S410). At S410, when the reliability value is greater than the threshold 2 (Thr2) (Yes at S410), the map calculation unit 1082 proceeds to S412. It should be noted that when the reliability value is less than or equal to the threshold 2 (Thr2) (No at S10), the map calculation unit 1082 goes back to S402. At S402, the edge strength detection unit 1084 evaluates the edge strength G for a next one of the representative background pixels.

The map calculation unit 1082 weights the texture direction or texture directions of at least one representative background pixel, based on the location or locations of the at least one representative background pixel and the location of a missing pixel to calculate a texture direction (x-y direction) corresponding to the missing pixel (S412). Here, the missing pixel is located in a predetermined distance from a representative background pixel. Moreover, since there are several missing pixels in the predetermined distance from the representative background pixel, x-y directions (preliminary texture directions), each corresponding to one of the missing pixels are calculated at S412. It should be noted that a x-y direction (a preliminary texture direction) calculated herein is a direction in which weighted directions of the representative background pixels are summed, in accordance with the distances between one of the missing pixels and the representative background pixels and the directions of the representative background pixels with respect to one of the missing pixels.

The map calculation unit 1082 checks whether all the representative background pixels selected by the representative background pixel selection unit 104 have been evaluated (S414). In other words, the map calculation unit 1082 checks whether all the missing pixels included in a missing pixel region have been evaluated, using the texture directions of the representative background pixels selected by the representative background pixel selection unit 104.

At S414, when there is an unevaluated representative background pixel among the representative background pixels selected by the representative background pixel selection unit 104 (No at S414), the map calculation unit 1082 goes back to S402. At S402, the edge strength detection unit 1084 evaluates the edge strength G for the next representative background pixel, i.e., one of the unevaluated representative background pixels.

It should be noted that when all the representative background pixels selected by the representative background pixel selection unit 104 have been evaluated (Yes at S414), the map calculation unit 1082 proceeds to the next step S416.

At S416, the map calculation unit 1082 averages each of the preliminary texture directions of the calculated missing pixels to calculate texture directions (resulting x-y directions), each corresponding to one of the missing pixels.

It should be noted that a detailed method for calculating a texture direction map is not limited to the above case. Another example will be described with reference to FIG. 9.

Figure 9:
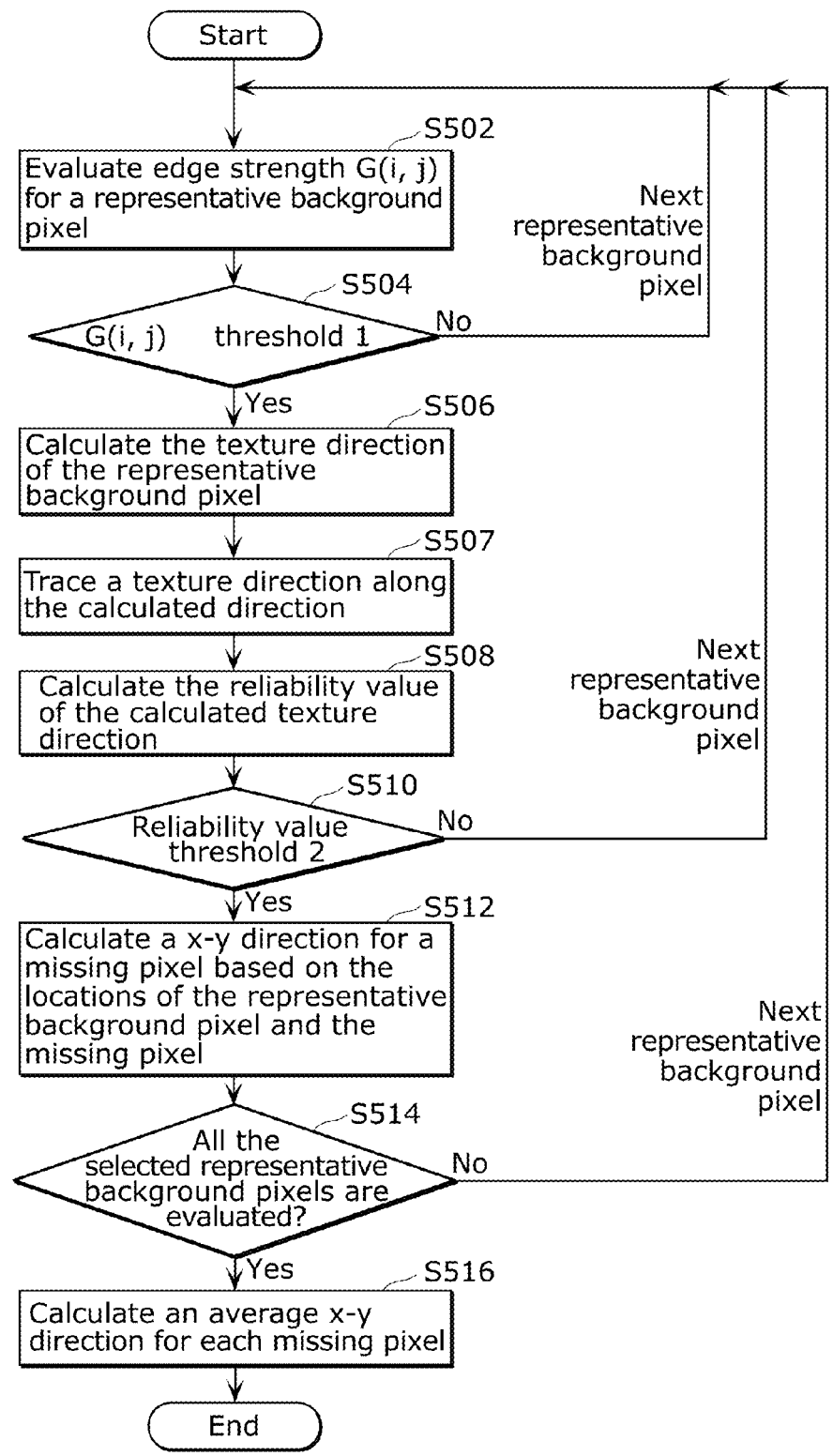
FIG. 9 is another flowchart showing a detailed procedure for calculating a texture direction map according to the first embodiment.

FIG. 9 is another flowchart showing a detailed procedure for calculating a texture direction map according to the present embodiment. It should be noted that since S502 to S506 correspond to S402 to S406 in FIG. 8 and S510 to S516 correspond to S410 to S416 in FIG. 8, explanation for these steps will be omitted here.

At S506, the texture direction calculation unit 1081 calculates the texture directions of representative background pixels.

The reliability value computation unit 1083 traces the calculated texture direction along the edge direction of a representative background pixel for which edge strength is determined to be greater than a threshold at S504 (S507), to calculate the reliability value of the calculated texture direction (S508). For example, the reliability value calculation unit 1083 calculates a reliability value for the texture direction of a representative background pixel to be calculated, based on (i) the distance between the representative background pixel in the texture direction to be calculated and a calculated representative background pixel and (ii) the orientation of the vector of the texture direction of the calculated representative background pixel with respect to the texture direction of the representative background pixel to be calculated. In other words, the reliability value calculation unit 1083 calculates a reliability value, based on the vector orientation of a current texture direction calculated by tracing at S507 and the vector orientation of the previously calculated texture direction.

Figure 10:
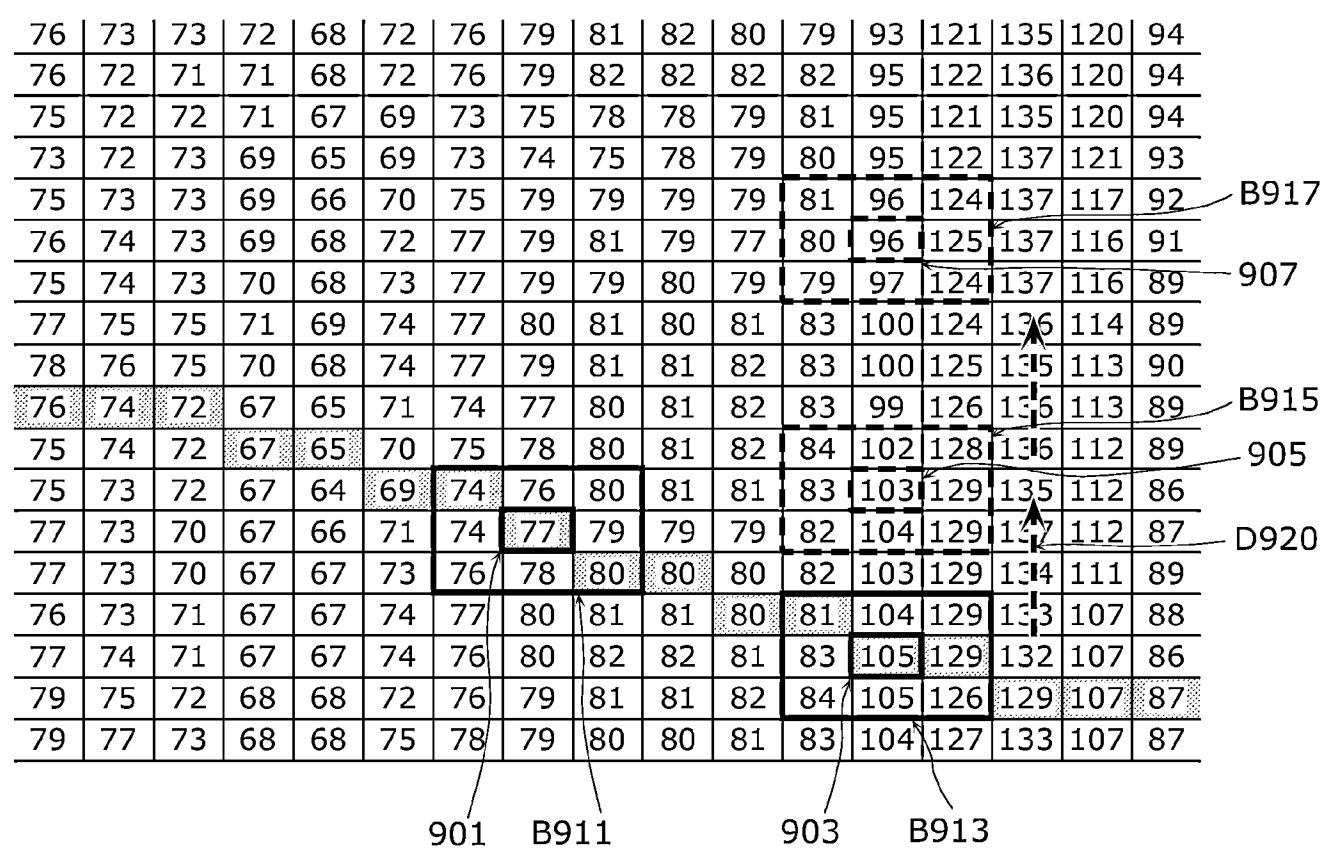

FIG. 10 shows a calculation example of the texture directions of representative background pixels selected in an input image according to the present embodiment. FIG. 10 shows brightness values for a portion of the input image.

Here, for example, a pixel 903 is one of the representative background pixels selected as above. In this case, the texture direction calculation unit 1081 may calculate the texture direction of the pixel 903 by, for example, performing the convolution over a block B913 centered at the pixel 903. It should be noted that the 3×3 Sobel operator can be, for example, used for the convolution. Thus, the texture direction calculation unit 1081 can obtain the texture direction of the pixel 903, i.e., gradients (brightness gradients) in the x direction (horizontal direction) and the y direction (vertical direction) of the pixel 903.

Moreover, the texture direction calculation unit 1081 may calculate a texture direction by evaluating the edge strength of a representative background pixel as above. For example, when the edge strength is evaluated using the Sobel operator, as having big differences in the brightness values in the x direction, the pixel 903 has a strong gradient for the x direction. This means that the pixel 903 has an edge direction, the same direction as y direction (direction D920).

On the other hand, the texture direction calculation unit 1081 may calculate the texture direction of a pixel 901, using a block B911. In this case, since the pixel 901 does not have big differences in the brightness values in the x and y directions, the pixel 901 has a weak gradient both for the x and y directions. Therefore, the edge strength of the pixel 901 evaluated by the edge strength detection unit 1084 is smaller than the threshold Thr1. Thus, further processing is not performed for the pixel 901.

It should be noted that although the direction D920 is obtained for the pixel 903 as mentioned above, the reliability value calculation unit 1083 may trace the calculated texture direction along the calculated edge direction in order to further verify the accuracy of the calculated texture direction (here, direction D920).

Moreover, the reliability value calculation unit 1083 may evaluate, with a block 915, a pixel 905 that is a representative background pixel to be calculated, based on the direction D920 of the pixel 903 (calculated texture direction of a representative background pixel). Likewise, a next pixel 907 (a pixel 907 in the block B911) may be evaluated based on the direction D920 of the pixel 903.

It should be noted that as mentioned above, the texture direction may be calculated by tracing an edge direction.

The following describes the further details of a method for calculating the texture direction of a representative background pixel.

pb denotes the location of a background pixel (pixel location) selected near the foreground image region in an input image. It should be noted that this pixel location corresponds to the location of an effective background pixel near a hole region in a generated new viewpoint image. The gradient of this pixel location can be calculated using Equation 6.

[Math. 6]

$$g_x = S_y \otimes I_L(p_b), \text{ and } g_y = -S_x \otimes I_L(p_b) \quad \text{(Equation 6)}$$

Here, gx denotes a horizontal edge direction, and gy denotes a vertical edge direction.

[Math. 7]

$\otimes$ $\otimes$ denotes a convolution operator.

Moreover, $S_x$ and $S_y$ are modified Sobel operators and are expressed as, for example, the following equation 7.

[Math. 8]

$$S_x = \begin{bmatrix} -3 & 0 & 3 \\ -10 & 0 & 10 \\ -3 & 0 & 3 \end{bmatrix}, S_y = \begin{bmatrix} -3 & -10 & -3 \\ 0 & 0 & 0 \\ 3 & 10 & 3 \end{bmatrix} \quad \text{(Equation 7)}$$

The edge strength G indicating gradient strength can be calculated using Equation 8.

[Math. 9]

$$G = \sqrt{g_x^2 + g_y^2} \quad \text{(Equation 8)}$$

Here, when the edge strength G is greater than the threshold Thr1, edge directions tx and ty are traced using Equations 9 to 11.

[Math. 10]

$$t_x^{(i)} = t_x^{(i-1)} + g_x^{(i)}, \; t_y^{(i)} = t_y^{(i-1)} + g_y^{(i)} \quad \text{(Equation 9)}$$

and

[Math. 11]

$$g_x^{(i)} = S_y \otimes I_L(p_b + \alpha^{(i-1)} t'^{(i-1)}_x) \quad \text{(Equation 10)}$$

$$g_y^{(i)} = -S_x \otimes I_L(p_b + \alpha^{(i-1)} t'^{(i-1)}_y) \quad \text{(Equation 11)}$$

Here, t'x and t'y are the normalized tx and ty, respectively, α is a predetermined operation step. i denotes the number of steps of tracing along an edge direction. For example, eight steps may be used to ensure that the edge (texture direction) is long enough. The texture direction map of a missing pixel p is calculated using Equations 12 and 13.

[Math. 13]

$$\theta_x(p) = \frac{1}{\sum_{k \in R} w_k(p)} \sum_{k \in R} w_k(p) t'_{x,k}(p) \quad \text{(Equation 12)}$$

[Math. 14]

$$\theta_y(p) = \frac{1}{\sum_{k \in R} w_k(p)} \sum_{k \in R} w_k(p) t'_{y,k}(p) \quad \text{(Equation 13)}$$

It should be noted that when the direction of a pixel j is evaluated in the above equation,

[Math. 15]

$$w_j(q) = l_j^2(q) / (h_j^2(q) + \beta)$$

is a weighted value for a missing pixel location q.

lj is the distance between the pixel j and the pixel location q that is orthogonal with respect to a depth edge pixel. hj is the distance between a pixel q and a calculated direction. β is a constant. $\theta_x$ and $\theta_y$ are used in the hole filling steps.

Figure 11:
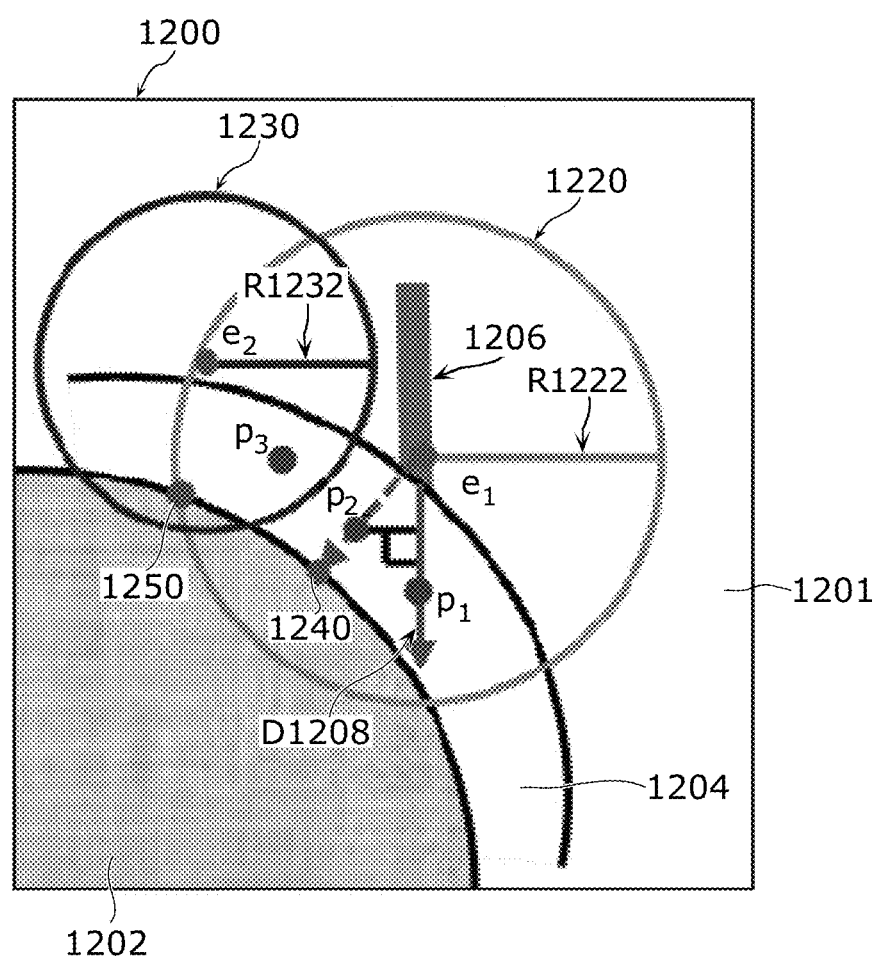
FIG. 11 is an illustration to explain the concept of a method for calculating a texture direction map for missing pixels according to the first embodiment.

FIG. 11 is an illustration to explain the concept of a method for calculating a texture direction map for missing pixels according to the present embodiment.

FIG. 11 shows a new viewpoint image 1200 including a background image region 1201 and a foreground image region 1202. A missing pixel region 1204 occurs in the new viewpoint image 1200. FIG. 11 also shows representative background pixels e1 and e2, and missing pixels p1, p2, and p3, together with edge pixels 1240 and 1250.

A texture 1206 schematically shows the texture for the representative background pixel e1. The edge pixels 1240 and 1250 correspond to edge pixels that indicate the boundary between the foreground and background image regions 1202 and 1201 and that are detected in the new viewpoint image 1200. The representative background pixel e1 corresponds to a representative background pixel that is selected for the edge pixel 1240. The representative background pixel e2 corresponds to a representative background pixel that is selected for the edge pixel 1250.

A direction D1208 is a texture direction calculated for the representative background pixel e1. Here, a radius R1222 is determined based on the direction D1208, and missing pixels included in a circle 1220 defined by the radius R1222 may be determined.

The following describes, as an example, missing pixels that are pixels in the circle 1200 centered at the representative background pixel e1.

The x-y direction (texture direction) of the missing pixel p1 is calculated by weighting the texture direction of the representative background pixel e1. This weight (weighted value) is, for example, calculated based on the distance between the missing pixel p1 and the representative background pixel e1 (first distance) and the distance from the line in the direction D1208 to the missing pixel p1 (second distance). In the example shown in FIG. 11, as the missing pixel p1 is in the line in the direction D1208, the second distance is zero. Therefore, the texture direction of the missing pixel p1 is calculated based on the direction D1208 and the first distance.

Likewise, the x-y direction (texture direction) of the missing pixel p2 is calculated by weighting the texture direction of the representative background pixel e1. In other words, the x-y direction (texture direction) of the missing pixel p2 is calculated based on the direction D1208 and both first and second distances. Here, the first distance is the distance between the missing pixel p2 and the representative background pixel e1. The second distance is the distance from the line in the direction D1208 to the missing pixel p2. In the example shown in FIG. 11, the weighted value of the missing pixel p1 is greater than the weighted value of the missing pixel p2.

Moreover, the missing pixel p3 is located both in the circles 1220 and 1230. In this case, as shown in Equations 10 and 11, the texture direction (direction D1208) of the representative background pixel e1 and the texture direction of the representative background pixel e2 are weighted (blended) to calculate the texture direction of the missing pixel p3.

Thus, after the texture directions of all the missing pixels (texture direction map) are calculated, it is possible to fill the missing pixel region 1204 (hole region).

It should be noted that since information on the hole region (missing pixel region) cannot be obtained from an input image, filling a hole region is not a simple task. The important clue is that a hole region is a background image region in a new viewpoint image.

Therefore, in the present embodiment, a hole region is filled using the texture directions of representative background pixels. In other words, it is possible to appropriately fill the hole region, using background pixels (texture pixels) in the background image region that are obtained using texture direction maps $\theta_x$ and $\theta_y$.

This will be described using the following equations. The missing pixel p in a generated new viewpoint image can be calculated using Equations 14 and 15.

[Math. 16]

$$I_N(p)=I_N(p+\Delta) \quad \text{(Equation 14)}$$

[Math. 17]

$$\Delta=(2\lambda\theta'_x(p), 2\lambda\theta'_y(p)) \quad \text{(Equation 15)}$$

In the above equations, $\theta'_x(p)$ and $\theta'_y(p)$ denote the normalized directions of the missing pixel p. $\lambda$ denotes the distance between the missing pixel p and a non-missing pixel (background pixel) closest to the missing pixel p in the calculated direction.

Here, to ensure that

[Math. 18]

$$I_N(p+\Delta)$$

is a background pixel, the corresponding location in the shifted depth map (new depth map) is checked.

Figure 12:
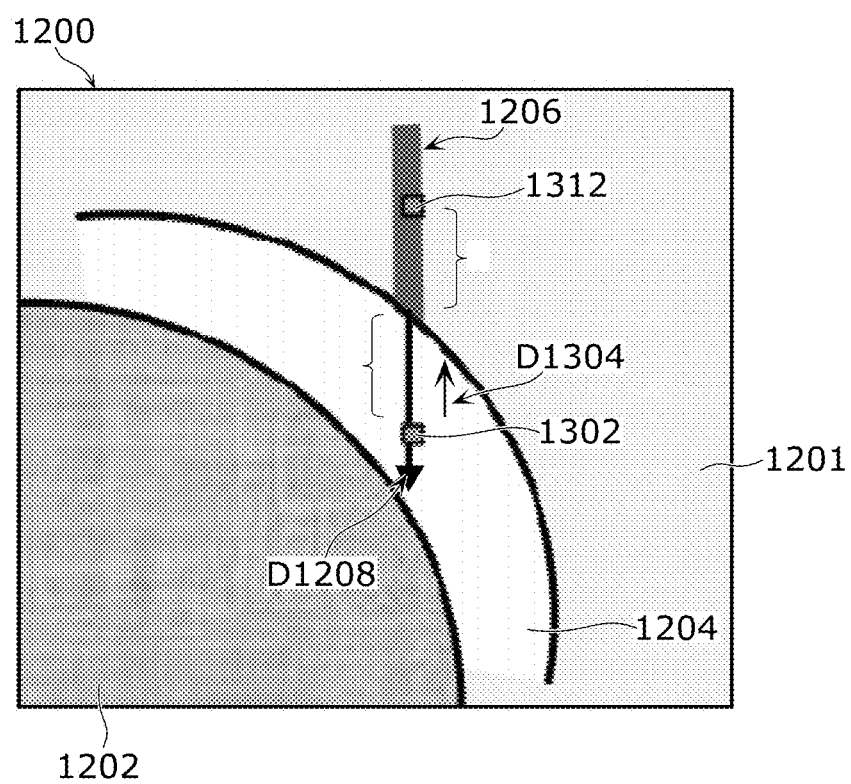
FIG. 12 is an illustration to explain the concept of a method for filling a missing pixel region according to the first embodiment.

With reference to FIG. 12, a method for filling a missing pixel region will be described that uses background pixels obtained using a texture direction map. FIG. 12 is an illustration to explain the concept of a method for filling a missing pixel region according to the present embodiment.

As shown in FIG. 12, a background pixel 1312 is extracted (flipped) along a texture direction D1304 calculated based on the direction D1208 to fill a missing pixel 1302. Here, as mentioned above, $\lambda$ denotes the distance between the missing pixel 1302 and a background pixel closest to the missing pixel 1302 in the calculated texture direction D1304. The distance between the missing pixels 1302 and 1312 is $2\lambda$.

Thus, a missing pixel region can be naturally filled with appropriate background pixels by using texture directions, each corresponding to one of missing pixel locations for filling the missing pixel region.

It should be noted that to obtain smooth texture, missing pixels may be filled using bilinear interpolation in addition to the above method. Thus, a higher quality new viewpoint image can be obtained by filling missing pixels with more appropriate background pixels.

Figure 13:
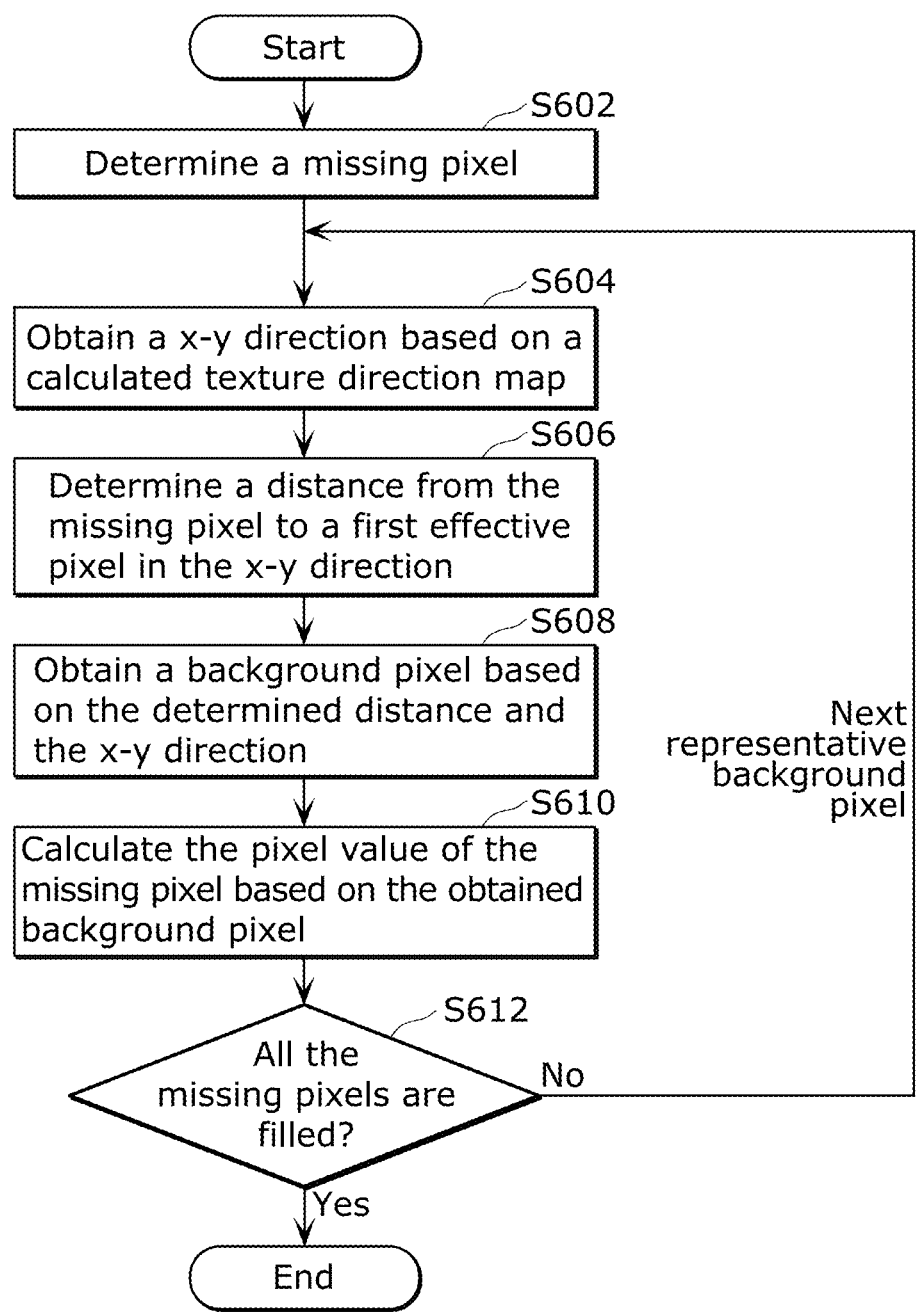
FIG. 13 is a flowchart showing an example of a detailed method for filling missing pixels according to the first embodiment.

The following describes a detailed method for filling a missing pixel region with reference to FIG. 13.

FIG. 13 is a flowchart showing an example of the detailed method for filling missing pixels according to the present embodiment.

The hole-filling processing unit 110 obtains the x-y direction (texture direction) of a missing pixel determined at S602 such as $\theta'_x(p)$ and $\theta'_y(p)$ of the missing pixel (S604). The hole-filling processing unit 110 determines the distance ($\lambda$) from the missing pixel to a first valid pixel (background pixel) in the obtained x-y direction (S606). The hole-filling processing unit 110 obtains a background pixel based on the determined distance ($\lambda$) and the x-y direction (S608). The hole-filling processing unit 110 calculates the pixel value of the missing pixel, based on the obtained background pixel (S610). The hole-filling processing unit 110 determines whether or not all the missing pixels have been filled (S610). At S612, when any missing pixels are determined to be unfilled (No at S612), the hole-filling processing unit 110 determines a next missing pixel and repeats the processing starting from S604. On the other hand, when all the missing pixels are determined to be filled (Yes at S612), the hole-filling processing unit 110 ends the processing.

Figure 14:
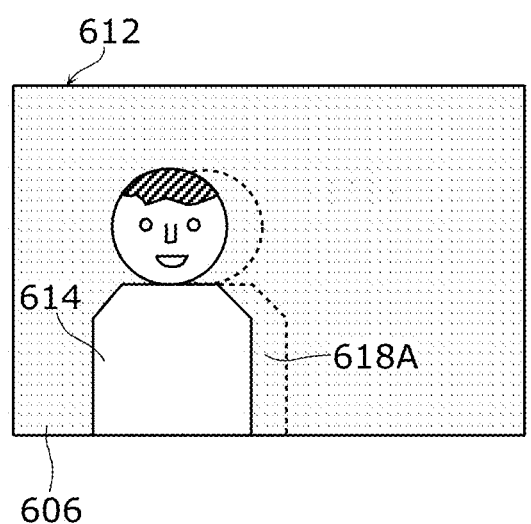
FIG. 14 shows an example of a new viewpoint image obtained by complementing the new viewpoint image including missing pixels that is shown in FIG. 7B.

In this way, the apparatus for generating a new viewpoint image 100 can generate a new viewpoint image (new view). For example, as shown in FIG. 14, missing pixels are naturally filled with background pixels in a region 618A. Here, FIG. 14 shows an example of the new viewpoint image 612 obtained by complementing a new viewpoint image including missing pixels that is shown in FIG. 7B. Same reference numerals are given to the same elements as those shown in FIG. 7B, and detailed description will be omitted here.

The present embodiment can achieve an apparatus and a method for generating a new viewpoint image that can generate a clearer and more natural new viewpoint image.

For example, an apparatus and a method for generating a new viewpoint image according to the present embodiment calculates the orientation of the texture by tracing a strong texture gradient in a representative background pixel along the direction of the background pixel. The texture direction map of the missing pixels (pixels in a hole region) is calculated based on the orientations of texture. Thus, missing pixels can be filled using background pixels along the directions guided by the texture direction map. Thus, the background texture directions can be correctly calculated in various cases. This allows the quality of output images to improve.

It should be noted that an apparatus and a method for generating a new viewpoint image according to the present embodiment may, for example, (i) evaluate edge strength for each of the selected representative background pixels, (ii) calculate the texture direction of a selected representative background pixel for which the edge strength is greater than a threshold, and (iii) further calculate a reliability value by tracing the texture direction to calculate the orientation of the texture. In these cases, background pixels for filling missing pixels are obtained using the above information. In this way, both linear and non-linear missing pixels (pixels in a hole region) can be naturally filled.

Thus, an apparatus and a method for generating a new viewpoint image according to the present embodiment can produce natural texture in a hole region while reducing blur and preventing distortion in a foreground image region. In other words, as an apparatus and a method for generating a new viewpoint image according to the present embodiment can produce clear and natural image texture, it is possible to reduce blur and boundary artifacts while maintaining the shape of a foreground image region.

Therefore, an apparatus and a method for generating a new viewpoint image according to the present embodiment can generate a high quality new viewpoint image even when a long baseline is synthesized. Moreover, using this new viewpoint image for 3D display can improve 3D quality. In other words, an apparatus and a method for generating a new viewpoint image according to the present embodiment can be used for 3D application.

Modification

It should be noted that in the above embodiment, a baseline parameter and a zero parallax parameter may be set according to input from a user. The following describes the details.

Figure 15:
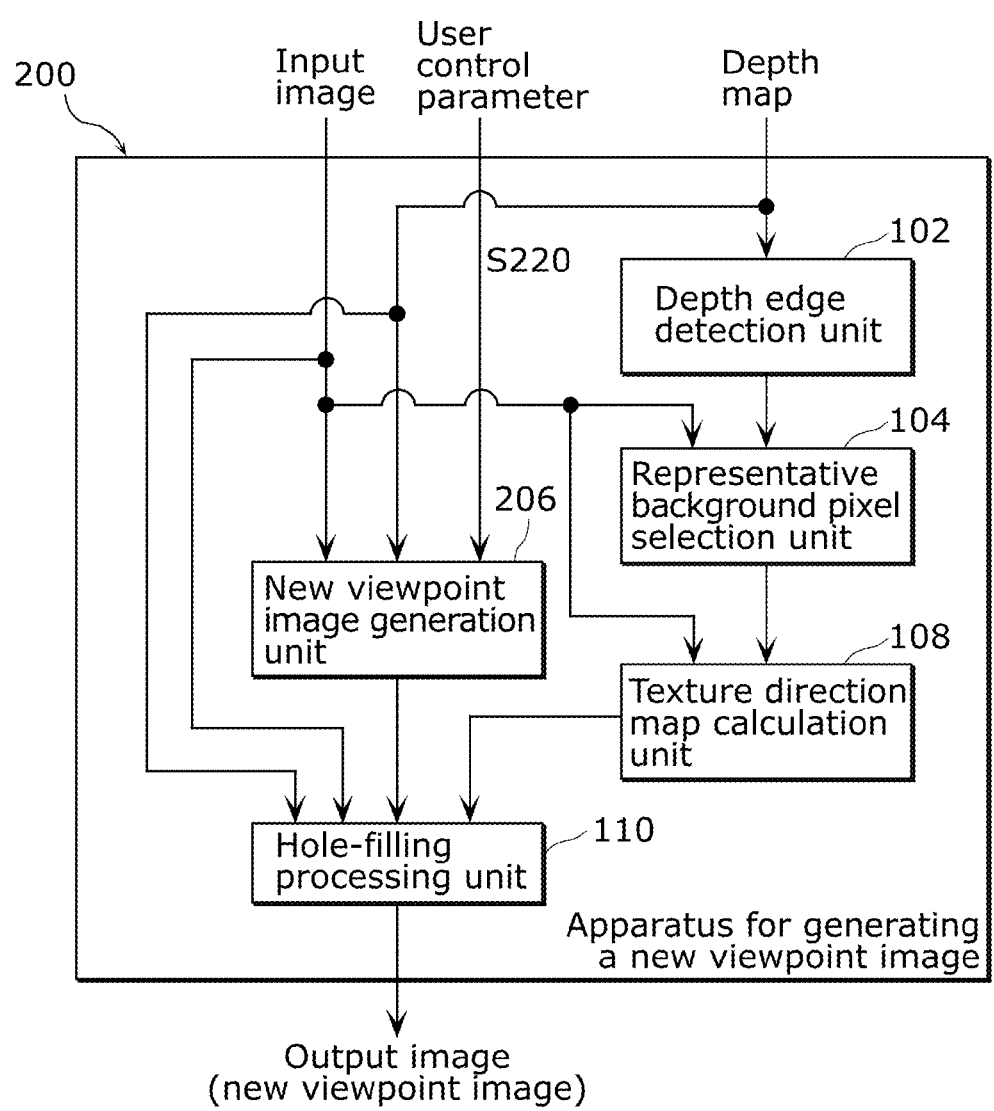
FIG. 15 is a block diagram showing a configuration example of an apparatus for generating a new viewpoint image 200 according to a modification of the first embodiment.

FIG. 15 is a block diagram showing a configuration example of an apparatus for generating a new viewpoint image 200 according to a modification of the present embodiment. Same reference numerals are given to the same elements as those shown in FIG. 1, and detailed description will be omitted here.

A new viewpoint image generation unit 206 in the apparatus for generating a new viewpoint image 200 shown in FIG. 15 is different from the new viewpoint image generation unit 106 in the apparatus for generating a new viewpoint image 100 shown in FIG. 1.

Specifically, the new viewpoint image generation unit 206 also takes in a control parameter signal S220 from a user to generate a new viewpoint image according to input from the user such as a baseline parameter (B) and a zero parallax setting parameter (z). As being the same as explanation for the new viewpoint image generation unit 106, further description will be omitted here.

Figure 16A:
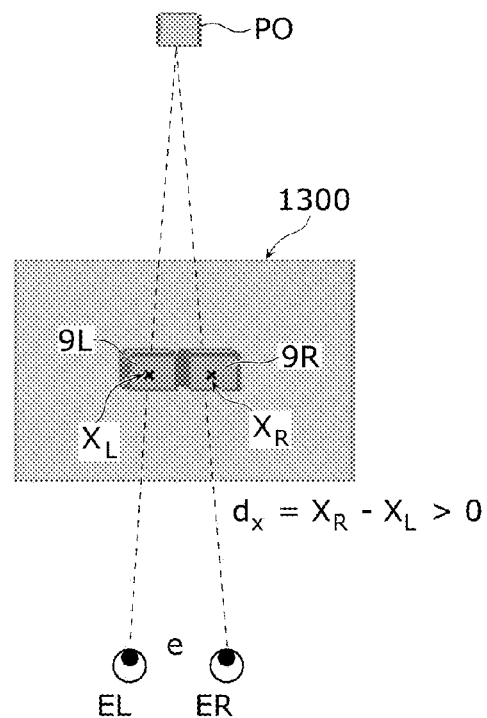
FIG. 16A is an illustration to explain differences in advantage when a user adjusts or controls control parameters.
Figure 16B:
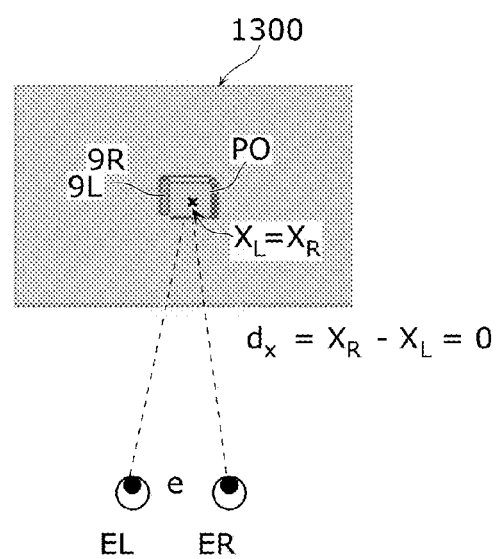
FIG. 16B is an illustration to explain differences in advantage when a user adjusts or controls control parameters.
Figure 16C:
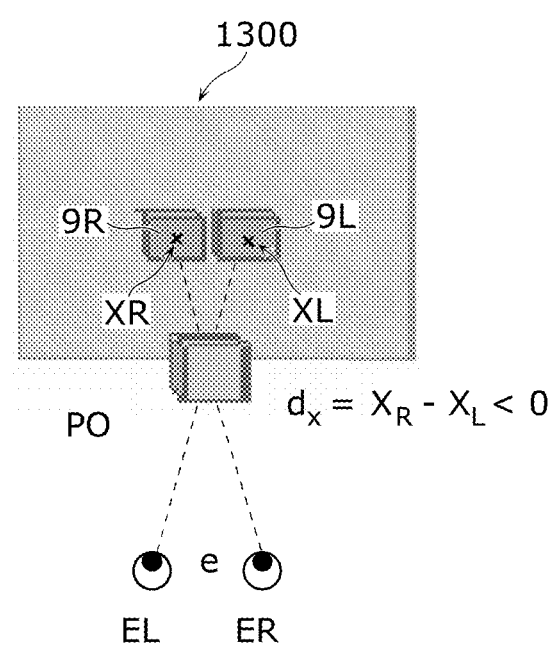
FIG. 16C is an illustration to explain differences in advantage when a user adjusts or controls control parameters.

FIGS. 16A to 16C are illustrations to explain differences in advantage when a user adjusts or controls a control parameter. FIGS. 16A to 16C show a left eye EL and a right eye ER of the user, a foreground image region for the left eye 9L, a foreground image region 9R for the right eye, and an object PO displayed on a display screen 1300. Here, the foreground image region 9L for the left eye and the foreground image region for the right eye 9R correspond to foreground image regions in an input image and a new viewpoint image generated from the input image.

FIG. 16A shows an example that parallax is positive and the object PO appears deep-in from (i.e., behind) the display screen 1300. FIG. 16B shows an example that parallax is zero and the object PO appears on the display screen 1300. Moreover, FIG. 16C shows an example that parallax is negative and the object PO appears to pop out from (i.e., in front of) the display screen 1300.

Thus, the user can control the object to have more or less difference in how the object appears with respect to the display screen by adjusting the baseline parameter (B). Moreover, the user can control the object to obtain a pop-out effect and a deep-in effect by adjusting the zero parallax setting parameter (z).

As mentioned above, an apparatus and a method for generating a new viewpoint according to the present embodiment can generate a shifted depth map by shifting an inputted depth map based on the value of the inputted depth map and input from the user.

It should be noted that as same as the present embodiment, a filter may be applied to the new depth map in order to remove small holes (cracks) from the shifted depth map (new depth map).

In this case, a new viewpoint image is generated based on the input image and the new depth map after filtering. As an advantage for this, crack artifacts are completely removed from the foreground image region of the generated image. Therefore, the quality of an output image increases.

Embodiment 2

The present embodiment describes an example of an apparatus including an apparatus for generating a new viewpoint image described in the first embodiment.

Figure 17:
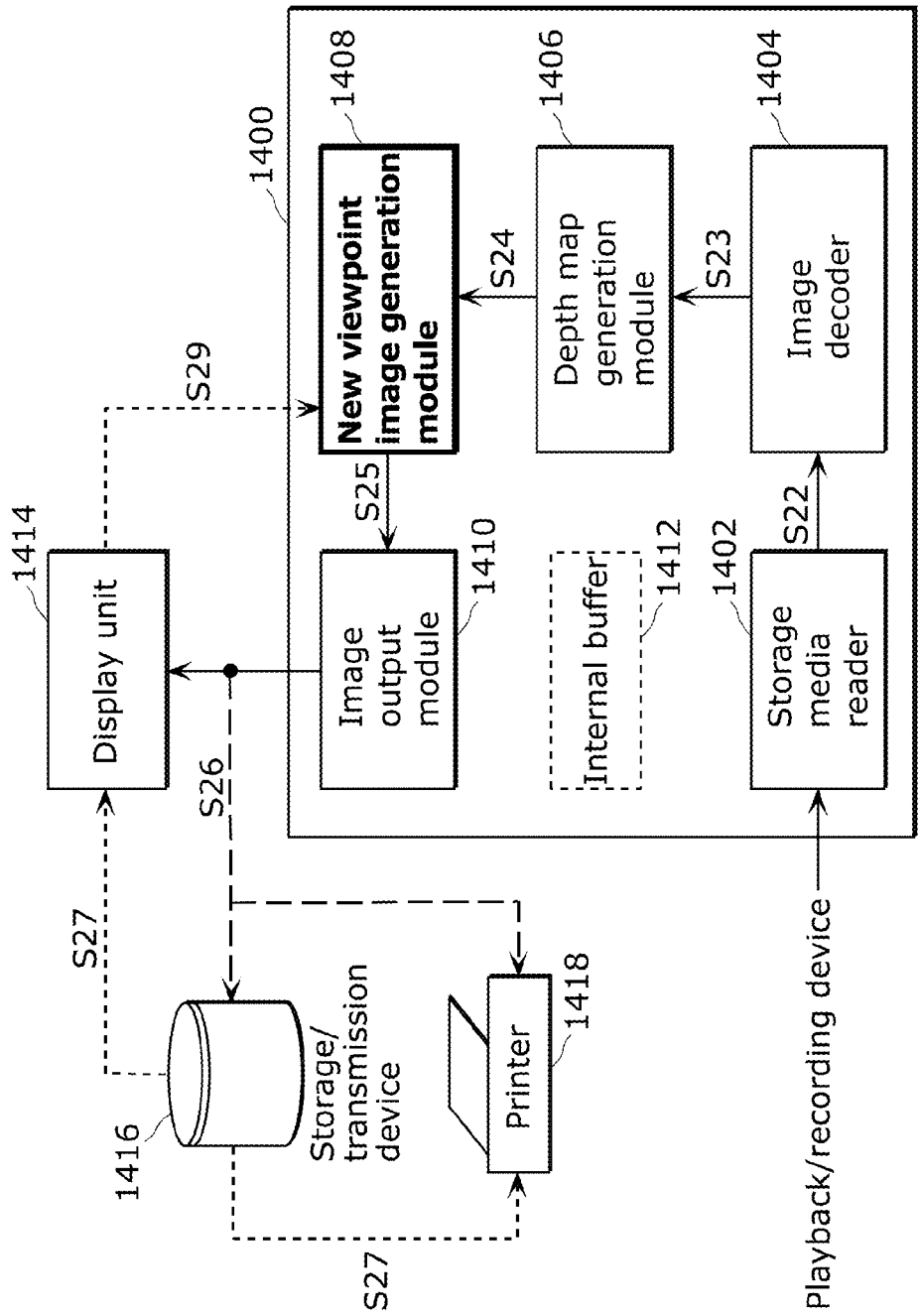
FIG. 17 is a block diagram showing a configuration of a playback/recording device including a new viewpoint image generation module.

FIG. 17 is a block diagram showing a configuration of a playback/recording device 1400 including a new viewpoint image generation module 1408. The device 1400 takes in image/video data using a storage media reader 1402, and sends a signal S22 to an image decoder 1404. When the image/video data is encoded, the image decoder decodes the image/video data and sends the decoded image/video data to a depth map generation module 1406. The depth map generation module 1406 generates a depth map and sends the generated depth map to a new viewpoint image generation module 1408. The new viewpoint image generation module 1408 generates a new viewpoint image and sends the generated new viewpoint image to an image output module 1410. The image output module 1410 outputs an image that includes a generated new viewpoint image and that can be used for display at a display unit 1414, for storage/transmission, or for printing. Here, the new viewpoint image generation module 1408 corresponds to the apparatus for generating a new viewpoint image described in the first embodiment.

Figure 18:
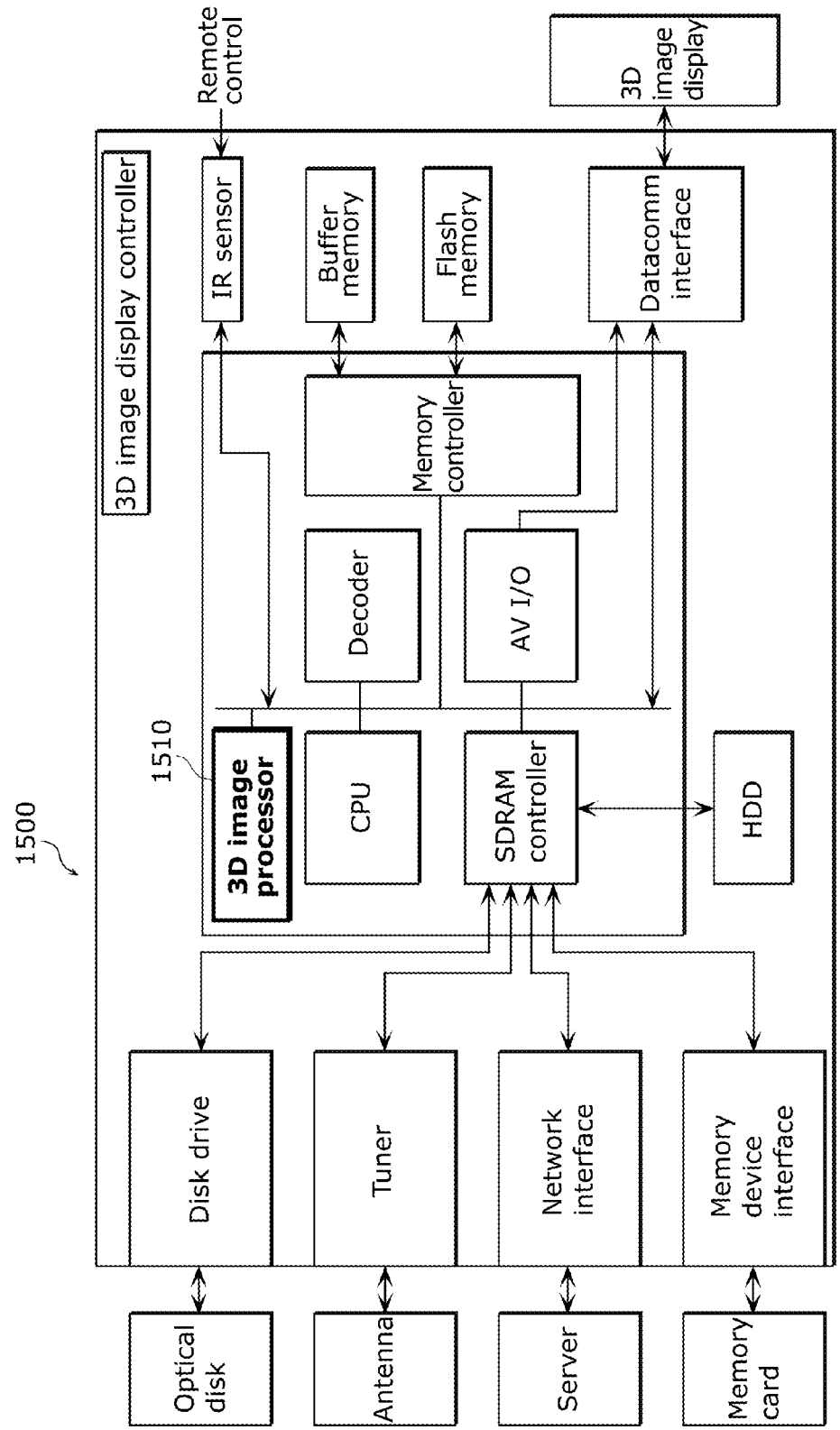
FIG. 18 is a block diagram showing a configuration of a display including an apparatus for generating a new viewpoint image.

FIG. 18 is a block diagram showing a configuration of a display 1500 including an apparatus for generating a new viewpoint image. A 3D image processor 1510 may provide an apparatus for generating a new viewpoint image in the processor with an input image and a depth map. 3D image may be displayed on the display unit of the display 1500. A user may control parameters for the apparatus for generating a new viewpoint image, using a remote control or other similar devices, to control 3D effects.

The 3D image processor 1510 and other modules therein are typically achieved in the form of integrated circuits (ICs), application-specific integrated circuits (ASIC), large scale integrated (LSI) circuits, or digital signal processor (DSP). Each of these modules can be in many single-function LSIs, or also can be in one integrated LSI. The name used here is LSI, but it may also be called IC, system LSI, super LSI, or ultra LSI in accordance with the degree of integration. Moreover, ways to achieve integration are not limited to the LSI, and a special circuit or a general purpose processor may also achieve the integration. This includes a specialized microprocessor such as digital signal processor (DSP) that can be directed by the program instruction. Field Programmable Gate Array (FPGA) that can be programmed after manufacturing LSI or a reconfigurable processor that allows re-configuration of the connection or configuration of LSI can be used for the same purpose. In the future, with advancement in manufacturing and process technology, a brand-new technology may replace LSI. The integration can be achieved by such a technology.

Figure 19:
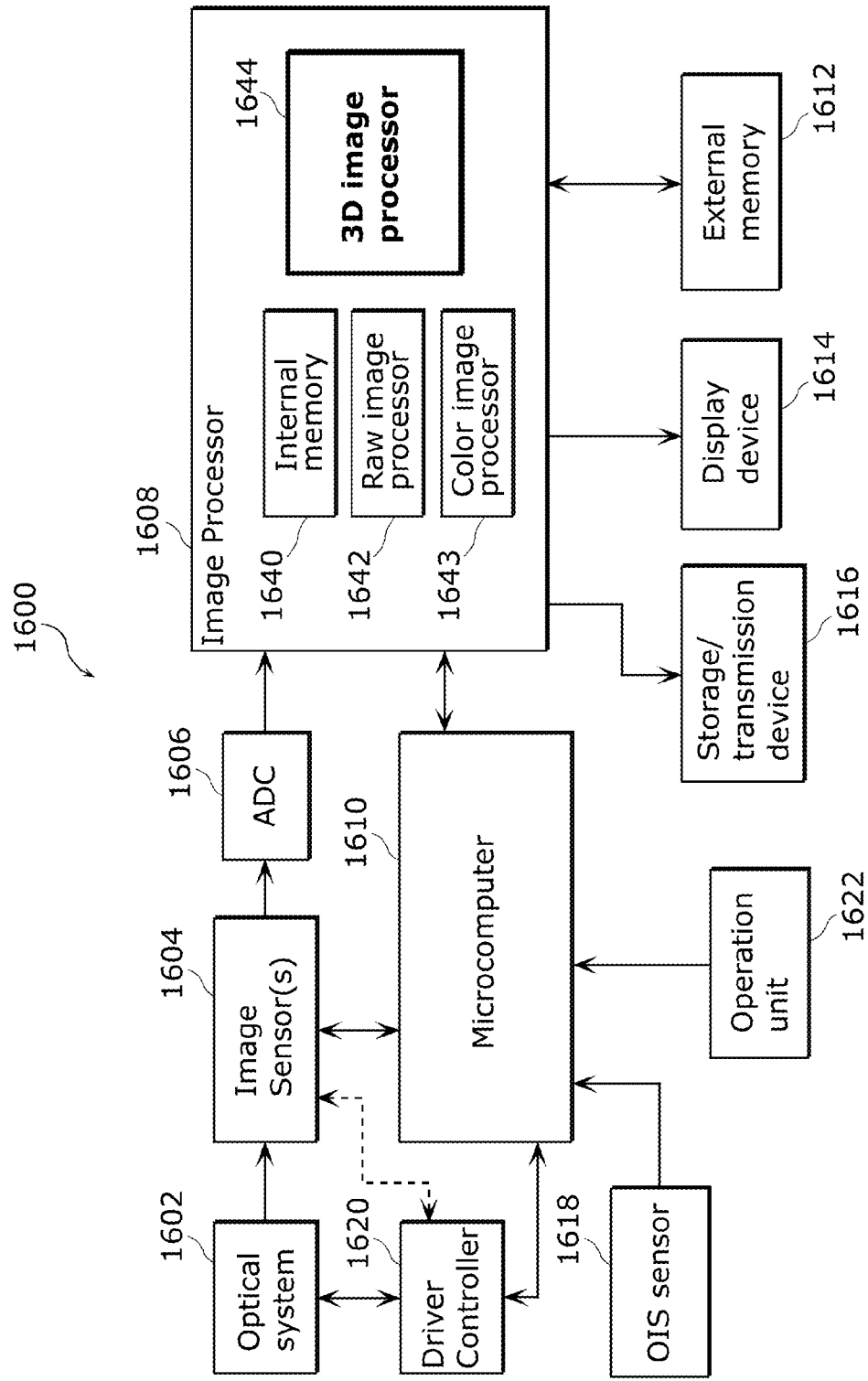
FIG. 19 is a block diagram showing a configuration of an imaging apparatus including an apparatus for generating a new viewpoint image.

FIG. 19 is a block diagram showing a configuration of an imaging apparatus 1600 including an apparatus for generating a new viewpoint image. The imaging apparatus 1600 includes an optical system 1602, an image sensor(s) 1604, an analog-to-digital converter (ADC) 1606, an image processor 1608, a microcomputer 1610, an external memory 1612, a driver controller 1620, an optical image stabilizer (OIS) sensor 1618, an operation unit 1622, a storage/transmission device 1616, and a display device 1614.

The image processor 1608 includes an internal memory 1640, a raw image processor 1642, a color image processor 1643, and a 3D image processor 1644. The 3D image processor 1644 includes the apparatus for generating a new viewpoint image according to the first embodiment. On the other hand, other components such as a microphone and a speaker are not shown. However, this does not limit the scope and spirit of the present disclosure.

The optical system 1602 may include components such as lenses or a set of lenses, zoom/focus mechanisms, actuators, shutters, and apertures in order to control light signals reaching the image sensor(s) 1604. The image sensor 1604 accumulates incoming light signals and converts the light signals into electrical signals. Moreover, the microcomputer 1610 directs the image sensor 1604. The electrical signals are converted into digital data (raw image data) by the ADC 1606 and stored in the internal memory 1640 or the external memory 1612. The raw image processor 1642 may take in the raw image data from the internal memory 1640 (or the external memory 1612) and perform many pre-processing (not shown in FIG. 19) such as resizing, linearity correction, white balance, and gamma correction. This pre-processed raw image can be stored or transmitted by the storage/transmission device 1616. The pre-processed raw image can also be processed by the color image processor 1643 to generate a color image such as RGB (three primary colors of light) or YCbCr. To generate a desired color image, the color image processor 1643 may perform color interpolation, color correction, tonal rage adjustment, color noise reduction, and other processing. The 3D image processor 1644 may take in one or more images (such as stereo images) and may re-generate 3D images using an apparatus for generating a new viewpoint image included in the 3D image processor 1644. When displayed on the display device 1614, the output 3D image(s) may be used for visualization and may also be stored in the storage/transmission device 1616 for further use. Storage devices, for example, include but are not limited to flash-based memory cards, hard drivers, and optical devices. Transmission devices, for example, include but are not limited to a HDMI interface, a USB interface, a wireless interface and a direct-to-printer interface. The storage or transmission device may optionally consist of lossless or lossy compression.

The optical system 1602 may be controlled by the driver controller 1620 which is directed by the microcomputer 1610. The operation portion 1622 receives user operation input and sends electrical signals to the microcomputer 1610. The microcomputer 1610 then directs related modules corresponding to the user input, such as the driver controller 1620, the image sensor(s) 1604, and the image processor 1608. The OIS sensor 1618 detects motion due to hand tremor or camera motion, and sends electrical signals to the microcomputer 1610. To move the lenses compensating for the motion, the microcomputer 1610 directs the driver controller 1620 to control actuators or the like in the optical system 1202. This reduces blur caused by hand tremor or camera motion.

The image processor 1608, the 3D image processor 1644, and the modules in the processors are typically achieved in the form of Integrated Circuits (ICs), Application-Specific Integrated Circuits (ASICs), or Large Scale Integrated (LSI) circuits. Each of these modules can be in many single-function LSIs, or can be in one integrated LSI. The name used here is LSI, but it may also be called IC, system LSI, super LSI, or ultra LSI in accordance with the degree of integration. Moreover, ways to achieve integration are not limited to the LSI, and a special circuit or a general purpose processor may also achieve the integration. This includes a specialized microprocessor such as DSP (digital signal processor) that can be directed by the program instruction. Field Programmable Gate Array (FPGA) that can be programmed after manufacturing LSI or a reconfigurable processor that allows re-configuration of the connection or configuration of LSI can be used for the same purpose. In the future, with advancement in manufacturing and process technology, a brand-new technology may replace LSI. The integration can be achieved by such a technology.

It should be noted that each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing an image decoding device and others according to each of the embodiments is a program described below.

In other words, this program causes a computer to execute: a method for generating a new viewpoint image, which generates, from an input image, a new viewpoint image that is an image of the input image viewed from a new viewpoint, the input image including a foreground image region that is an image region of an object and a background image region other than the foreground image region, the program including: shifting the foreground image region in the input image, based on a depth map corresponding to the input image to generate a new viewpoint image including a missing pixel region; selecting background pixels located a predetermined number of pixels away from edge pixels, from among background pixels included in the background image region, as representative background pixels, the edge pixels indicating a boundary between the foreground image region and the background image region in the input image; calculating a texture direction of each of the selected representative background pixels, the texture direction being an edge direction of texture in the background image region for each of the representative background pixels, and to calculate a texture direction map indicating texture directions, each corresponding to one of missing pixels, based on locations of the representative background pixels and locations of the missing pixels included in the missing pixel region; and filling the missing pixel region with the background pixels in accordance with the texture direction map.

Although an apparatus and a method for generating a new viewpoint image according to only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be used for, for example, an apparatus and a method for generating a new viewpoint image, and especially for, for example, an apparatus and a method for generating a new viewpoint image that are included in imaging devices such as digital still cameras and movie cameras and that can generate a new viewpoint image constituting a stereoscopic image or a multi-view image for 3D display.

The invention claimed is:

1. An apparatus for generating a new viewpoint image, which generates, from an input image, a new viewpoint image that is an image of the input image viewed from a new viewpoint, the input image including a foreground image region that is an image region of an object and a background image region other than the foreground image region, the apparatus comprising:

a generation unit configured to shift the foreground image region in the input image, based on a depth map corresponding to the input image to generate a new viewpoint image including a missing pixel region, according to a depth image based rendering (DIBR) technique;

a selection unit configured to select background pixels located a predetermined number of pixels away from edge pixels, from among background pixels included in the background image region, as representative background pixels, the edge pixels indicating a boundary between the foreground image region and the background image region in the input image;

a texture direction map calculation unit configured to calculate a texture direction of each of the selected representative background pixels, the texture direction being an edge direction of texture in the background image region for each of the representative background pixels, and to calculate, for all of missing pixels, a texture direction map indicating texture directions each corresponding to one of the missing pixels, based on locations of the representative background pixels and locations of the missing pixels included in the missing pixel region; and a hole-filling processing unit configured to entirely fill, at one time, the missing pixel region with the background pixels without using the pixels of the foreground image region, while considering continuity at a boundary with the background image region and without considering discontinuity at a boundary with the foreground image region, in accordance with the texture direction map indicating the texture directions of the missing pixels.

2. The apparatus for generating a new viewpoint image according to claim 1, wherein the texture direction map calculation unit includes:

a texture direction calculation unit configured to calculate texture directions of the representative background pixels; and a map calculation unit configured to calculate the texture direction map by weighting the texture directions of the representative background pixels based on the locations of the representative background pixels and the locations of the missing pixels and calculating the texture directions, each corresponding to one of the missing pixels.

3. The apparatus for generating a new viewpoint image according to claim 2, wherein the map calculation unit is configured to calculate the texture directions, each corresponding to one of the missing pixels, by (i) calculating a direction in which weighted texture directions of the representative background pixels are summed, as one of preliminary texture directions of the missing pixels, in accordance with distances between one of the missing pixels and the representative background pixels and directions of the representative background pixels with respect to one of the missing pixels and (ii) averaging each of the calculated preliminary texture directions of the missing pixels.

4. The apparatus for generating a new viewpoint image according to claim 2, further comprising a reliability value calculation unit configured to calculate reliability values for the calculated texture directions of the representative background pixels, wherein the map calculation unit is configured to calculate the texture directions, each corresponding to one of the missing pixels, by weighting a texture direction of at least one first representative background pixel, based on a location of the at least one first representative background pixel and locations of the missing pixels, each of the first representative background pixels being a pixel for which a reliability value greater than a predetermined threshold is calculated by the reliability value calculation unit, among the representative background pixels.

5. The apparatus for generating a new viewpoint image according to claim 4, wherein the reliability value calculation unit is configured to calculate a reliability value for a texture direction of a representative background pixel to be calculated, based on (i) a distance from a calculated representative background pixel to the representative background pixel to be calculated and (ii) an orientation of a vector of the calculated representative background pixel with respect to the representative background pixel to be calculated.

6. The apparatus for generating a new viewpoint image according to claim 2, wherein the texture direction calculation unit is configured to trace edges of texture of the background image region from the selected representative background pixels as starting points to calculate the texture directions of the selected representative background pixels.

7. The apparatus for generating a new viewpoint image according to claim 1, further comprising an edge strength calculation unit configured to calculate edge strength for each of the selected representative background pixels, wherein when the edge strength of the representative background pixel is greater than a threshold, the texture direction map calculation unit is configured to calculate a texture direction of the representative background pixel.

8. The apparatus for generating a new viewpoint image according to claim 1, further comprising an edge detection unit configured to detect, based on the depth map, edge pixels indicating a boundary between the foreground image region and the background image region in the input image, wherein the selection unit is configured to select, as the representative background pixels, background pixels located a predetermined number of pixels away from the edge pixels in a predetermined direction, the edge pixels being detected by the edge detection unit.

9. The apparatus for generating a new viewpoint image according to claim 8, wherein the selection unit is configured to, for each of the edge pixels detected by the edge detection unit, calculate an average value of horizontal differential coefficients and an average value of vertical differential coefficients for the edge pixel, determine an orthogonal direction of the edge pixel as the predetermined direction, using the average value of the horizontal differential coefficients and the average value of the vertical differential coefficients, and select, as one of the representative background pixels, a background pixel located a predetermined number of pixels away from the edge pixel in the determined orthogonal direction.

10. The apparatus for generating a new viewpoint image according to claim 1, wherein the generation unit is configured to generate a new viewpoint image including the missing pixel region by (i) shifting the foreground image region in the input image, based on a depth value in the depth map, a distance between a right eye and a left eye, and a zero eye position and (ii) shifting the depth value in a region of the depth map corresponding to the foreground image region.

11. The apparatus for generating a new viewpoint image according to claim 1, further comprising
a filter that filters a new depth map corresponding to the new viewpoint image to smooth a depth value that is a depth value in a region of the new depth map corresponding to the missing pixel region and is a depth value less than or equal to a predetermined value.

12. The apparatus for generating a new viewpoint image according to claim 1,
wherein the filling unit includes:
a direction obtaining unit configured to refer to the calculated texture direction map to obtain the texture directions, each corresponding to one of the missing pixels;
a distance determination unit configured to calculate distances from edge pixels to the missing pixels, the edge pixels being in the obtained texture directions, each corresponding to one of the missing pixels;
a pixel obtaining unit configured to obtain, based on the distances, background pixels in the corresponding texture directions; and
a filling unit configured to calculate pixel values of missing pixels, using the obtained background pixels to fill the missing pixel region, the pixel values being values having the corresponding texture directions.

13. A method for generating a new viewpoint image, which generates, from an input image, a new viewpoint image that is an image of the input image viewed from a new viewpoint, the input image including a foreground image region that is an image region of an object and a background image region other than the foreground image region, the method comprising:
shifting the foreground image region in the input image, based on a depth map corresponding to the input image to generate a new viewpoint image including a missing pixel region, according to a depth image based rendering (DIBR) technique;
selecting background pixels located a predetermined number of pixels away from edge pixels, from among background pixels included in the background image region, as representative background pixels, the edge pixels indicating a boundary between the foreground image region and the background image region in the input image;
calculating a texture direction of each of the selected representative background pixels, the texture direction being an edge direction of texture in the background image region for each of the representative background pixels, and to calculate, for all of missing pixels, a texture direction map indicating texture directions each corresponding to one of the missing pixels, based on locations of the representative background pixels and locations of the missing pixels included in the missing pixel region; and
filling entirely, at one time, the missing pixel region with the background pixels without using the pixels of the foreground image region, while considering continuity at a boundary with the background image region and without considering discontinuity at a boundary with the foreground image region, in accordance with the texture direction map indicating the texture directions of the missing pixels.

14. A non-transitory computer-readable recording medium for use in a computer, the recording medium having a computer program recorded thereon for causing the computer to execute:
a method for generating a new viewpoint image, which generates, from an input image, a new viewpoint image that is an image of the input image viewed from a new viewpoint, the input image including a foreground image region that is an image region of an object and a background image region other than the foreground image region, the program comprising:
shifting the foreground image region in the input image, based on a depth map corresponding to the input image to generate a new viewpoint image including a missing pixel region, according to a depth image based rendering (DIBR) technique;
selecting background pixels located a predetermined number of pixels away from edge pixels, from among background pixels included in the background image region, as representative background pixels, the edge pixels indicating a boundary between the foreground image region and the background image region in the input image;
calculating a texture direction of each of the selected representative background pixels, the texture direction being an edge direction of texture in the background image region for each of the representative background pixels, and to calculate, for all of missing pixels, a texture direction map indicating texture directions each corresponding to one of the missing pixels, based on locations of the representative background pixels and locations of the missing pixels included in the missing pixel region; and
filling entirely, at one time, the missing pixel region with the background pixels without using the pixels of the foreground image region, while considering continuity at a boundary with the background image region and without considering discontinuity at a boundary with the foreground image region, in accordance with the texture direction map indicating the texture directions of the missing pixels.

15. An integrated circuit for generating a new viewpoint image, which generates, from an input image, a new viewpoint image that is an image of the input image viewed from a new viewpoint, the input image including a foreground image region that is an image region of an object and a background image region other than the foreground image region, the integrated circuit comprising:
a generation unit configured to shift the foreground image region in the input image, based on a depth map corresponding to the input image to generate a new viewpoint image including a missing pixel region, according to a depth image based rendering (DIBR) technique;
a selection unit configured to select background pixels located a predetermined number of pixels away from edge pixels, from among background pixels included in the background image region, as representative background pixels, the edge pixels indicating a boundary between the foreground image region and the background image region in the input image;
a texture direction map calculation unit configured to calculate a texture direction of each of the selected representative background pixels, the texture direction being an edge direction of texture in the background image region for each of the representative background pixels, and to calculate, for all of missing pixels, a texture direction map indicating texture directions each corresponding to one of the missing pixels, based on locations of the representative background pixels and locations of the missing pixels included in the missing pixel region; and
a filling unit configured to entirely fill, at one time, the missing pixel region with the background pixels without using the pixels of the foreground image region, while considering continuity at a boundary with the background image region and without considering discontinuity at a boundary with the foreground image region, in accordance with the texture direction map indicating the texture directions of the missing pixels.

* * * * *